United States Patent
Miyano et al.

[11] Patent Number: 5,859,733
[45] Date of Patent: Jan. 12, 1999

[54] APPARATUS FOR DETECTING AND DISPLAYING POSITION OF A LENS ON AN OPTICAL AXIS

[75] Inventors: Masaaki Miyano, Sakai; Toyotoshi Kawasaki, Kawachinagano; Minoru Kuwana, Osaka; Masayuki Miyazawa, Kawachinagano; Masayuki Ueyama, Takarazuka; Yoshihiro Tasaka, Toyonaka, all of Japan

[73] Assignee: Minolta Co., Ltd., Osaka, Japan

[21] Appl. No.: 718,880

[22] Filed: Sep. 24, 1996

Related U.S. Application Data

[62] Division of Ser. No. 502,833, Jul. 14, 1995, Pat. No. 5,587,846.

[30]  Foreign Application Priority Data

Jul. 15, 1994  [JP]  Japan ................................... 6-185217
Jul. 15, 1994  [JP]  Japan ................................... 6-185219
Sep. 21, 1994  [JP]  Japan ................................... 6-226957
Sep. 21, 1994  [JP]  Japan ................................... 6-226958

[51] Int. Cl.$^6$ .................................................. G02B 7/02
[52] U.S. Cl. ........................... 359/824; 359/823; 359/694; 250/201.1
[58] Field of Search .................................. 359/823, 824, 359/814, 698, 826; 250/201.1, 201.2, 201.4; 356/345, 360

[56]  References Cited

U.S. PATENT DOCUMENTS

| 4,195,243 | 3/1980 | Thaxter .................................... 310/317 |
| 4,241,982 | 12/1980 | Uesugi ..................................... 359/823 |
| 4,490,018 | 12/1984 | Yokotsuka ............................... 359/823 |
| 4,894,579 | 1/1990 | Higuchi et al. .......................... 310/328 |
| 5,078,472 | 1/1992 | Sugawara ................................ 359/824 |
| 5,225,941 | 7/1993 | Saito et al. .............................. 359/824 |
| 5,289,318 | 2/1994 | Sekine et al. ........................... 359/814 |
| 5,301,066 | 4/1994 | Higuchi et al. .......................... 359/698 |
| 5,391,866 | 2/1995 | Hoshino et al. ...................... 250/201.2 |
| 5,430,375 | 7/1995 | Inoue et al. ............................. 359/824 |
| 5,442,166 | 8/1995 | Hollmann ............................. 250/201.1 |

FOREIGN PATENT DOCUMENTS

| 4-17584 | 1/1992 | Japan . |
| 4-60601 | 2/1992 | Japan . |
| 6-34872 | 2/1994 | Japan . |
| 6-123830 | 5/1994 | Japan . |

OTHER PUBLICATIONS

Article entitled "Continuous reduction with discrete operator selectable stops," *Research Disclosure*, Apr. 1, 1977.

*Primary Examiner*—Loha Ben
*Attorney, Agent, or Firm*—Sidley & Austin

[57]  ABSTRACT

A lens holding frame holding a lens in a lens barrel is arranged, and a contact member extending therebelow is in friction coupling with a driving axis. By applying driving pulses having such a waveform that includes a moderate rising portion followed by an abrupt falling portion to a piezoelectric element, the holding frame is moved along the direction of the optical axis. An index provided at the holding frame is exposed through a slit of lens barrel, and from the position of the lens on the holding frame, information with respect to the distance to the object is displayed. Detection of the position of the holding frame is performed by a position sensor of ferromagnetic thin film magnetoresistive element type (MR sensor) so as to obtain positional information of the lens on the holding frame based on the detection signal, and the obtained information may be displayed on a liquid crystal or other display portion provided on the lens unit or on a camera body.

6 Claims, 23 Drawing Sheets

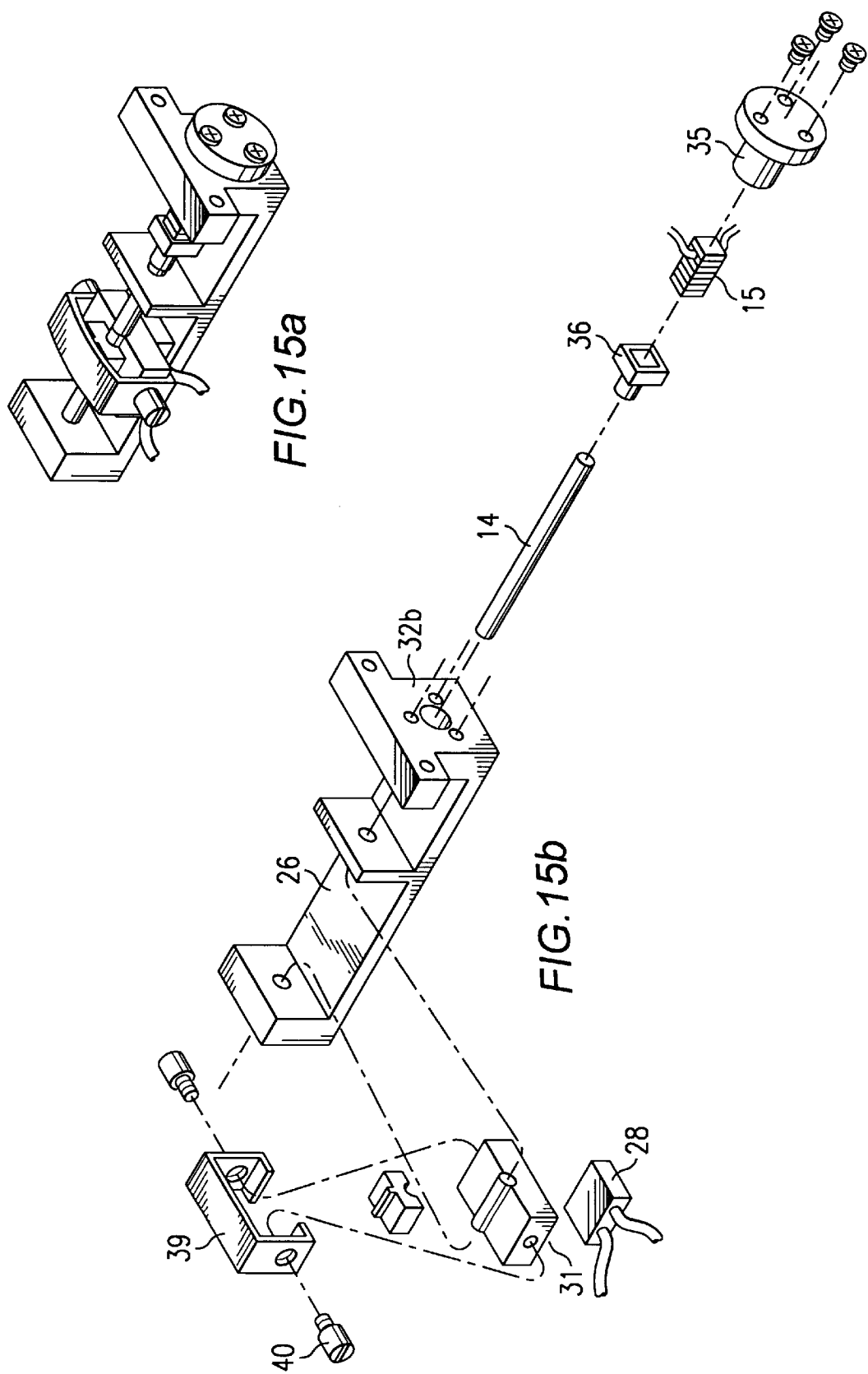

APPARATUS FOR DETECTING AND DISPLAYING POSITION OF A LENS ON AN OPTICAL AXIS

This application is a division, of application Ser. No. 08/502,833, filed Jul. 14, 1995 now U.S. Pat. No. 5,587,846.

BACKGROUND OF THE INVENTION

1. Field of the Invention

The present invention relates to a lens unit used in a camera or the like. More specifically, it relates to an apparatus for detecting a position of an optical element constituting the lens, and to a lens unit including an apparatus for displaying distance information to the object and focal length information.

2. Description of the Related Art

In a camera having automatic focus adjustment mechanism, focus adjustment is automatically performed when the lens is directed to an object to be photographed. There are various methods of focus adjustment of a lens. As an example, a lens unit is known in which part of the optical elements constituting the lens, for example, a front lens group is moved along an optical axis based on focus detection information indicative of the state of defocus with respect to an object, so that an in-focus state is realized. Since the distance information to the object to be photographed is important data when taking a photograph, the distance information to the object is displayed on a lens barrel, for example, when the lens is in-focus with respect to the object.

In cameras in which focal length can be altered, the focal length is often displayed on the lens barrel, for example.

In the conventional lens unit, a movable lens barrel, positioned in a fixed lens barrel, is rotated around a helicoid screw, or operated along a cam, so as to perform focus adjustment operations and focal length changing operations. Therefore, distance to the object or the focal length information set in the lens unit is displayed utilizing relative angle of movement between the fixed lens barrel and the movable lens barrel.

As for the method of moving the lens unit, another example includes an impact type actuator method in which drive pulses are applied to a piezoelectric causing a lens to be moved along an optical axis.

In a structure in which a driving signal is output to the impact type actuator based on focus detection information (or set information with respect to the object to be photographed) and part of the optical elements constituting a lens unit is moved along the optical axis, a movable lens barrel is not necessary (as in the conventional lens unit example above), as only the lens support frame may be moved. However, in such a structure, information with respect to the lens cannot be displayed utilizing angle of relative movement between the fixed lens barrel and the movable lens barrel.

In the driving mechanism of optical elements to which the above described impact type actuator is applied, the lens holding frame moves along a driving axis. Therefore, when a magnetized rod is provided parallel to the driving axis, a magneto-resistive element is attached to the lens holding frame and a position sensor (MR sensor) for detecting the position based on the change in the magnetic resistance is provided. Consequently, the position of the lens holding frame, that is, the position of the moving lens, may be detected. In that case, if the space between the magnetized rod and the magneto-resistive element varies, there would be error in detection. Therefore, the variation in the space between the magnetized rod and the magneto-resistive element must be within a prescribed tolerable range over a considerably long distance of movement of the optical elements. For this purpose, it is necessary that the magnetized rod be positioned parallel to the driving axis and that any swing of the lens holding frame during movement is prevented. These requirements make assembly of the lens unit quite difficult.

Other than a magnetic type position sensor, an optical sensor employing a subscale and a main scale having small slits passing and intercepting light is known. With either of the magnetic or optical sensors, a sinusoidal wave is obtained as a detection signal. An intermediate level of the detection signal is compared with an analog signal represented by the sinusoidal wave. Crossing of the signal with the intermediate level generates a pulse signal, and the number of pulse signals is counted to detect the amount of movement.

In order to increase resolution of a detected amount of movement, the width of the slit of the scale may be made narrower in the optical system, and the width of magnetization of the magnet should be made thinner in the magnetic system.

However, the narrower the slit width of the scale, or the thinner the width of magnetization, the smaller the signal from the detector and the poorer becomes the signal-to-noise ratio. Further, in the optical system, the gap between the main scale and the subscale becomes smaller, and in the magnetic system, the gap between the magnetized magnet and the magnetic detecting element becomes smaller, so that in either system, the width of acceptable variation becomes very small. As a result, very severe dimensional accuracy is required of the structure of the element and the scale, and from this point, resolution of detection is limited.

Therefore, apart from conversion of an analog signal to a digital signal at the intermediate point level, a method of interpolation [has been] is known in which analog signals are divided into small pieces and digital signals are divided into small pieces so as to improve resolution in detection. Here, the term interpolation refers to the method of obtaining phase information finer than the signal frequency by dividing periodical signal output.

However, the signal obtained in the detector is a sinusoidal wave, which includes a linearly changing portion as well as a portion changing moderately with signal polarity being inverted. Therefore, resolution cannot be improved uniformly. A method to solve such a problem is disclosed, for example, in *NIKKEI Mechanical*, May 31, 1993. FIG. 30 is an illustration showing the method of interpolation disclosed in *NIKKEI Mechanical*. Here, a bar shaped permanent magnetic and ferromagnetic thin film magneto-resistive elements (hereinafter referred to as MR elements) are used as the position sensor. The details of the position sensor (MR sensor) including the MR elements will be described later.

Referring to FIG. 30, a saw tooth shaped output (4) is obtained by combining outputs (1), (2) and (3) from three MR elements. Since the position is detected by using only those portions where voltage changes largely with respect to the change in phase, accurate interpolation becomes possible.

In the conventional method of detection by the positional sensor devised to improve resolution, outputs from three MR elements have been used, which results in increased number of circuits and increased cost. Further, in this method, when the signal level changes, the amplitude of the triangular wave also changes, possibly resulting in error in detection.

Further, when a position detecting sensor is to be used for the lens unit, a reference position must be provided near the infinite position for a focus lens, and a reference position must be provided at a telephoto end or a wide end for a zoom lens. In order to detect such reference positions, the magnetic pattern of the magnetized rod may be changed. However, if such method is used, magnetization of the rod is difficult.

SUMMARY OF THE INVENTION

Therefore, an object of the present invention is to allow indication of information related to the lens in a simple structure in a lens unit employing an impact type actuator.

Another object of the present invention is to detect a position of a moving lens without error in a lens unit employing an impact type actuator.

A further object of the present invention is to provide a position detecting apparatus for a moving member which can improve resolution and which stably maintains high detection accuracy.

A still further object of the present invention is to enable detection of a specific position by a simple structure without changing magnetizing pattern of the magnetized rod.

The above described objects of the present invention can be attained by a lens unit in which optical elements constituting a lens can be moved along an optical axis by driving a driving mechanism utilizing an electromechanical converting element such as an impact type actuator, including: a pointer pointing position of an optical element in the lens as position information; and a display for displaying a scale corresponding to the position information of the optical element; in which position information is displayed by arranging the pointer close to the scale of the display.

The position of the moving optical element is displayed as position information by means of the pointer. Since the position of the optical element indicates distance to the object or focal length, information with respect to the lens such as the distance to the object and the focal length can be displayed by a simple structure, as the display having a scale is arranged close to the pointer.

According to another aspect of the present invention, by the driving mechanism employing an impact type actuator driven based on the focus detecting information, an optical element constituting the lens unit moves, through a driven member, along the direction of an optical axis. At this time, the driven member moves over a magnetized rod arranged in the direction of the optical axis and detects a resistance value of a magneto-resistive element. Thus, position of the optical element is detected. If the magnetized rod is adapted to serve also as the driving member or the magnetized rod is adapted to serve also as a guide member, the space between the magnetized rod and the magneto-resistive element can be kept constant, preventing error in detection. Therefore, the position of the moving lens can be detected without error in a lens unit employing an impact type actuator.

In a still further aspect of the present invention, the position detecting apparatus of the moving member includes a moving member which outputs during movement first and second sinusoidal wave signals of which the signals' phases are shifted by 90° from each other dependent on the position of the moving member; a unit for calculating a ratio of the first and second output signals to each other; a unit for synthesizing continuous triangular waves based on the calculated ratio; and a unit for interpolating the position of the moving member based on the synthesized triangular waves.

Since the ratio of two sinusoidal waves shifted by 90° is calculated, a triangular wave which changes linearly in accordance with the change in position of the moving member can be obtained, and therefore resolution in detection can be improved. Further, since the ratio between signals is obtained, even if there is any variation in amplitude in the analog signal, the variation can be canceled and a stable triangular wave can be constantly obtained. Therefore, resolution in detection can be improved stably.

As a result, a position detecting apparatus for a moving member which can improve resolution and provides stable, high detection accuracy stably can be obtained.

According to a still further aspect of the present invention, the position detecting apparatus of a moving member includes a magnetic rod member having a magnetic portion of which a magnetic field varies periodically. A magnetic sensor is moved along the magnetic rod member and used for detecting the position of the moving member, with the magnetic rod member having a notch portion at a desired position.

Since a notch is provided at a desired reference position such as a terminal end point on the magnetic rod, the magnetic sensor outputs a signal corresponding to the notch which is different from the signals obtained from periodically varying magnetic fields. As a result, specific position can be detected by a simple structure, without necessitating change in the magnetic pattern of the magnetized rod.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 14a, 14b, 15a and 15b are schematic diagrams showing modifications of the first and second embodiments.

DESCRIPTION OF THE PREFERRED EMBODIMENTS

(1) First Embodiment

Figure 1:
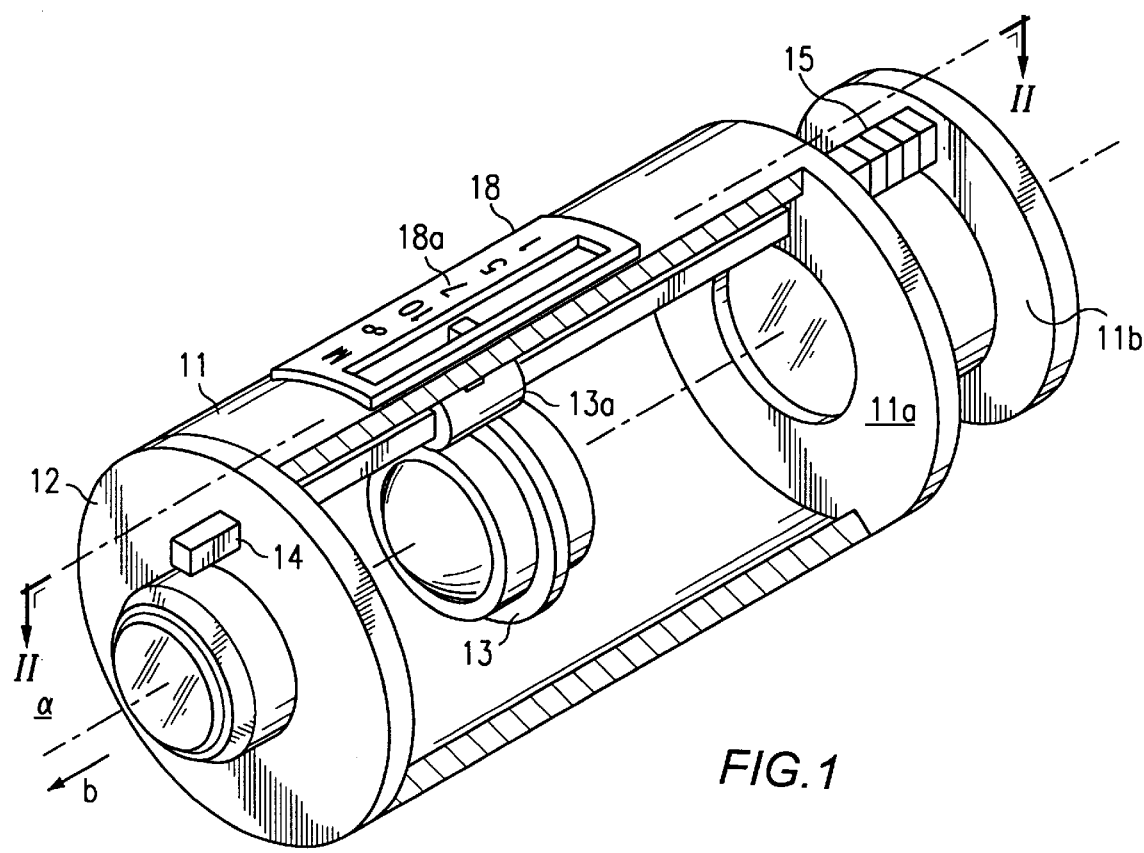
FIG. 1 is a perspective view showing a structure of a lens unit employing an electro-mechanical converting element to which the present invention is applied.

An embodiment of the present invention will be described. Referring to FIG. 1, an impact type actuator using an electromechanical converting element as a driving mechanism for moving an optical element constituting the lens along the direction of the optical axis a, to which the present invention is applied, will be described.

Referring to FIG. 1, on a lens outer barrel 11 of an actuator, a driving axis 14 for driving a lens holding frame 13 along the optical axis a is movably supported parallel to the optical axis a by means of holding frame 12 and first flange portion 11a. One end of driving axis 14 is secured to piezoelectric element 15. Piezoelectric element 15 is fixed between the first flange portion 11a and the second flange portion 11b of support frame 11.

Figure 2:
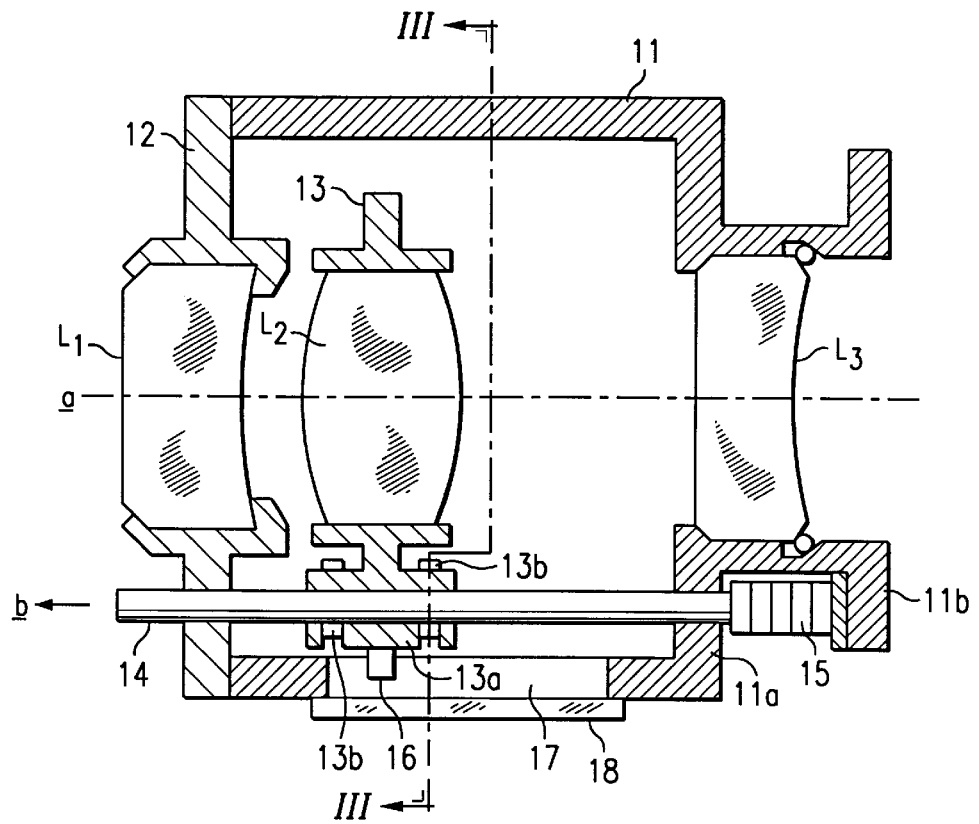
FIG. 2 is a cross section showing a structure of a first embodiment of the lens unit to which driving mechanism employing the electromechanical converting element of the present invention is applied.
Figure 3:
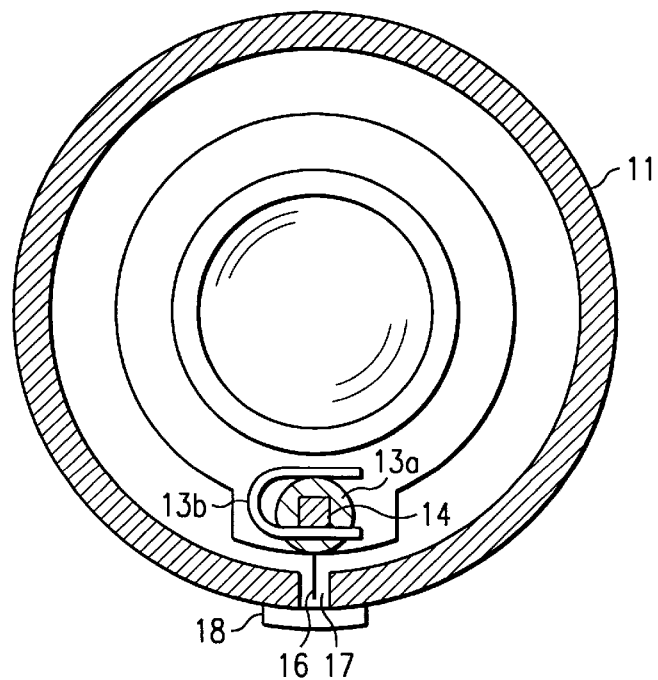
FIG. 3 is a cross section taken along the line III—III of the lens unit shown in FIG. 2.

FIG. 2 is a cross section of a portion denoted by the line II—II of FIG. 1 of the impact actuator, and FIG. 3 is a cross section of the portion denoted by III—III of FIG. 2. It should be noted that FIG. 2 is inverted vertically with respect to FIG. 1. Referring to FIGS. 2 and 3, the relation between the impact actuator shown in FIG. 1 and the lens will be described in greater detail.

Referring to FIGS. 2 and 3, on a left end of the lens outer barrel 11, a holding frame 12 of a first lens L1 is fixedly attached, and at the right end 11a, a holding frame of a third lens L3 is formed. In the lens outer barrel 11, a holding frame 13 of a second lens L2 is arranged so as to be movable along the direction of the optical axis a.

Driving axis 14 drives the holding frame 13 of the second lens L2 along the optical axis a. The axis 14 has a square cross section, as shown in FIG. 3. Driving axis 14 is movably supported parallel to the optical axis a by means of a first flange portion 11a of lens outer barrel 11 and of holding frame 12, with one end adhered and fixed to one surface of piezoelectric element 15.

Piezoelectric element 15 for displacing the driving axis 14 in an axial direction, displaces in its thickness direction, and it has one end surface adhered and fixed on driving axis 14 and the other end surface adhered and fixed on the second flange portion 11b of lens outer barrel 11.

Holding frame 13 of the second lens L2 has a contact member 13a extending therebelow, through which driving axis 14 passes. Further, contact member 13a has a notched groove formed at its lower surface. Contact member 13a and driving axis 14 are in pressure contact by means of a contact pressure spring 13b inserted between the notched groove and an upper surface of contact member 13a, and they are in friction coupling with appropriate friction force. FIG. 3 shows a state in which driving axis 14 and contact member 13a are in pressure contact by means of pressure contact spring 13b.

Figure 5:
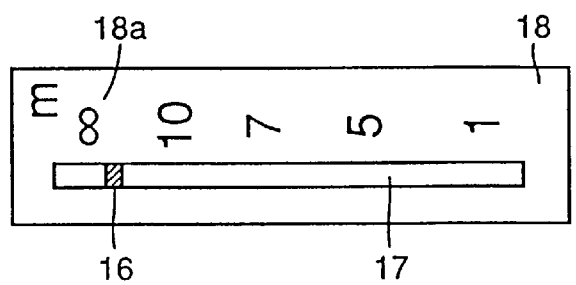
FIG. 5 is a plan view of a cover with an object distance scale, for the lens unit shown in FIG. 2.

An index 16 is fixed on lens holding frame 13, which index can be viewed from the outside through a slit 17 provided at lens outer barrel 11. The index 16 indicates the position of the second lens L2 with respect to lens outer barrel 11, which position corresponds to the distance to the object when the lens is focused on the object. A cover 18 formed of a transparent material having such a planar shape as shown in FIG. 5 is provided over slit 17 of lens outer barrel 11. A scale 18a of object distance is marked on cover 18. Therefore, by reading the position of index 16 with reference to the scale 18a of object distance, the distance to the object can be read.

In the above described structure, driving pulses are applied to piezoelectric element 15 for focus adjustment, based on focus detection information for an object, output from a focus detecting circuit provided on the side of a camera (not shown).

Figure 4:
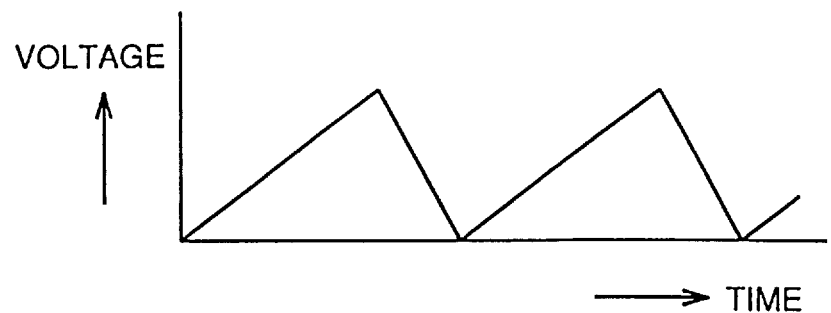
FIG. 4 shows an example of waveforms of driving pulses applied to the electromechanical converting element.

Now, assume that the focus detection information indicates that movement of lens L2 in the direction of the arrow b (FIG. 1) is necessary. Then, a driving pulse having such a waveform that includes a moderate rising portion followed by a rapid falling portion, as shown in FIG. 4, is applied to the piezoelectric element 15. At the moderate rising portion of the driving pulse, piezoelectric element expands in the thickness direction moderately, and driving axis 14 is displaced in the direction of the arrow b along its axis. Therefore, contact member 13a of lens holding frame 13 which is in friction coupling by pressure contact with the driving axis 14 by means of pressure contact spring 13b also moves in the direction of the arrow b. Therefore, lens holding frame 13 can be moved in the direction of the arrow b. At an abrupt falling portion of the driving pulse, piezoelectric element 15 shrinks in the thickness direction rapidly, and therefore driving axis 14 also displaces in the direction opposite to the arrow b along the axial direction of driving axis 14. At this time, contact member 13a of lens holding frame 13 which is in pressure contact with driving axis 14 by means of pressure contact spring 13b substantially remains at its position, overcoming the friction force against the driving axis 14 because of inertia, whereby lens holding frame 13 is not moved. By continuously applying the driving pulses having the above described waveform to the piezoelectric element 15, lens holding frame 13 can be continuously moved in the direction shown by the arrow b.

Here, the term "substantially" means that the lens holding frame follows the movement of the piezoelectric element 15 while contact member 13a of lens holding frame 13 slides over driving axis 14 in either the direction of the arrow b or the opposite direction, and the frame as a whole moves in the direction of the arrow b in accordance with the difference in driving time. The manner of movement is determined in accordance with given friction condition.

When output of driving pulses to the piezoelectric element 15 is stopped upon detection of the in-focus state by the focus detecting circuit, lens holding frame 13 stops its movement, and lens L2 is set at the in-focus position. At this time, by reading the index 16 provided on lens holding frame 13 in reference to the scale 18a, the distance to the object to be photographed can be known.

If focus detection information indicates that movement of lens L2 in the direction opposite to the direction of the arrow b (see FIG. 1) is necessary, driving pulses having a waveform including an abrupt rising portion followed by a moderate falling portion is applied. In this driving mechanism, contact member 13b of lens holding frame 13 is fitted and frictionally coupled to the driving axis 14 having a square cross section, and contact member 13a is guided with a side plane surface of the driving axis 14 being a guiding surface. Therefore, lens holding frame 13 can be moved along in an axial direction without rotation or swing, and therefore it is not necessary to provide additional guiding axis other than the driving axis 14.

In the driving mechanism described above, a driving axis having square cross section has been described. However, even when the cross section is not square, it is not necessary to provide additional guiding axis other than the driving axis 14 if the driving axis 14 has such a cross section that prevents rotation or swing of the lens holding frame 13, for example, a column having a groove.

Though an index 16 is provided on lens holding frame 13 and scale 18a is provided on lens outer barrel 11, the scale 18a may be provided on lens holding frame 13 and index 16 may be provided on lens outer barrel 11.

(2) Second Embodiment

Figure 6:
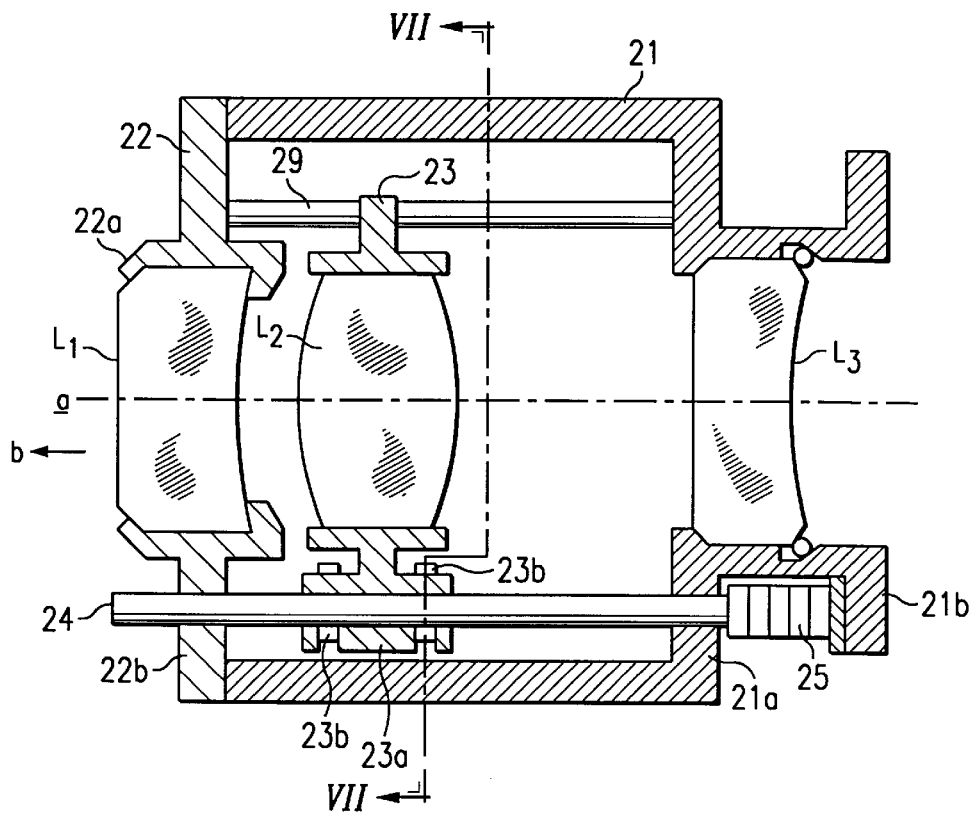
FIG. 6 is a cross section showing a structure of a second embodiment of the lens unit to which driving mechanism using the electro-mechanical converting element of the present invention is applied.
Figure 7:
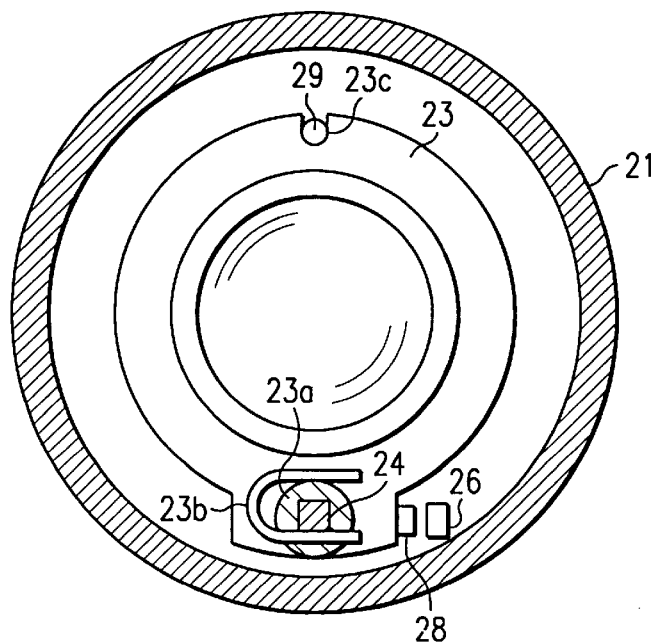
FIG. 7 is a cross section taken along the line VII—VII of the lens unit shown in FIG. 6.

A second embodiment of the present invention will be described with reference to FIGS. 6 and 7. FIG. 6 is a cross section of the second embodiment of a lens unit structure and FIG. 7 is a cross section taken along the line VII—VII of FIG. 6. Referring to FIGS. 6 and 7, on the left end of lens outer barrel 21, a holding frame 22 of a first lens L1 is fixedly attached, the right end 21a forms a holding frame for a third lens L3. In lens outer barrel 21, holding frame 23 is arranged so as to be movable along optical axis a, as will be described later. In order to detect distance of movement, a magneto-resistive element (hereinafter referred to as MR element) 28 is attached to lens holding frame 23 (see FIG. 7).

Referring to FIG. 7, in order to drive holding frame 23 of the second lens L2 along optical axis a, driving axis 24 is provided. A magnetized rod 26, for detecting distance of movement of lens holding frame 23 in cooperation with MR element 28, is magnetized with N and S magnetic poles at prescribed intervals. Magnetized rod 26 is arranged parallel to the driving axis 24.

Driving axis 24 is movably supported parallel to the optical axis a by means of a first flange portion 21b of lens outer barrel 21 and a flange portion 22b of lens holding frame 22, with one end of driving axis 24 adhered and fixed on one surface of piezoelectric element 25.

The piezoelectric element 25 displaces the driving axis 24 axially as the piezoelectric element 25 deforms in its thickness direction. The piezoelectric element 25 has one end surface adhered and fixed on driving axis 24 and the other end surface adhered and fixed on second flange portion 21b of lens barrel 21.

Holding frame 23 of the second lens L2 has a contact member 23a extending therebelow, and driving axis 24 passes through the contact member 23a. Contact member 23a is provided with a notched groove on its lower surface. Contact member 23a and driving axis 24 are in pressure contact by means of a pressure contact spring 23b inserted between the notched groove and the upper surface of contact member 23a, and they are in friction coupling with an appropriate friction force. FIG. 7 shows a state in which driving axis 24 and contact member 23a are in pressure contact by means of pressure contact spring 23b.

A notch 23c is formed also at an upper portion of lens holding frame 23, and [prevents, engaging with] engages guiding axis 29 to prevent rotation of lens holding frame 23.

The MR sensor will be described. The MR sensor is a position sensor of non-contact type used for detecting relatively long distance of movement or position, and it is constituted by a magnetized rod 26 and MR element 28.

Figure 8:
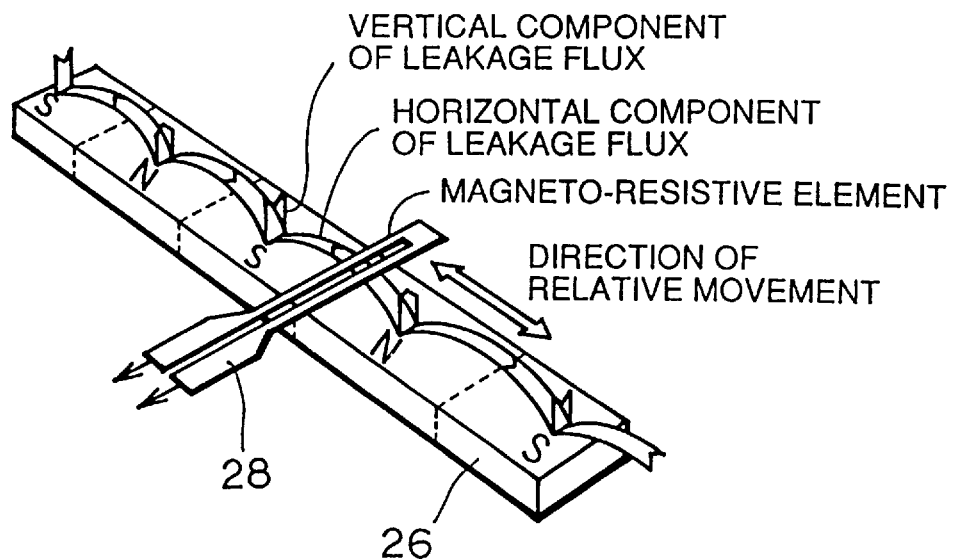
FIG. 8 is an illustration of a ferromagnetic thin film magneto-resistive position sensor (MR sensor).

The principal of operation will be described with reference to FIG. 8. On a magnetized rod 26 on which N and S magnetic poles are provided at prescribed intervals along the direction of movement, MR element 28 is arranged such that a current axis thereof is at a right angle with respect to the arrangement of the magnetic poles and such that the surface of MR element 28 is parallel to the surface of the magnetic poles. There is leakage flux from each of the magnetic poles as shown in FIG. 8, which leakage flux acts on MR element 28, a magneto-resistive effect which will be described in the following.

More specifically, when magneto-resistive MR element 28 is between magnetic poles of magnetized rod 26, a resistance of MR element 28 is reduced because of the magneto-resistive effect caused by the horizontal component of leakage flux. By contrast, when MR element 28 is over a magnetic pole, the resistance value of MR element 28 is not changed from that when there is no magnetic field, since there is not a horizontal component of leakage flux. When MR element 28 and magnetized rod 26 move relative to each other, the resistance value of MR element 28 changes periodically. Therefore, by counting the number of changes, the distance of movement, in other words, position, can be detected.

Figure 9:
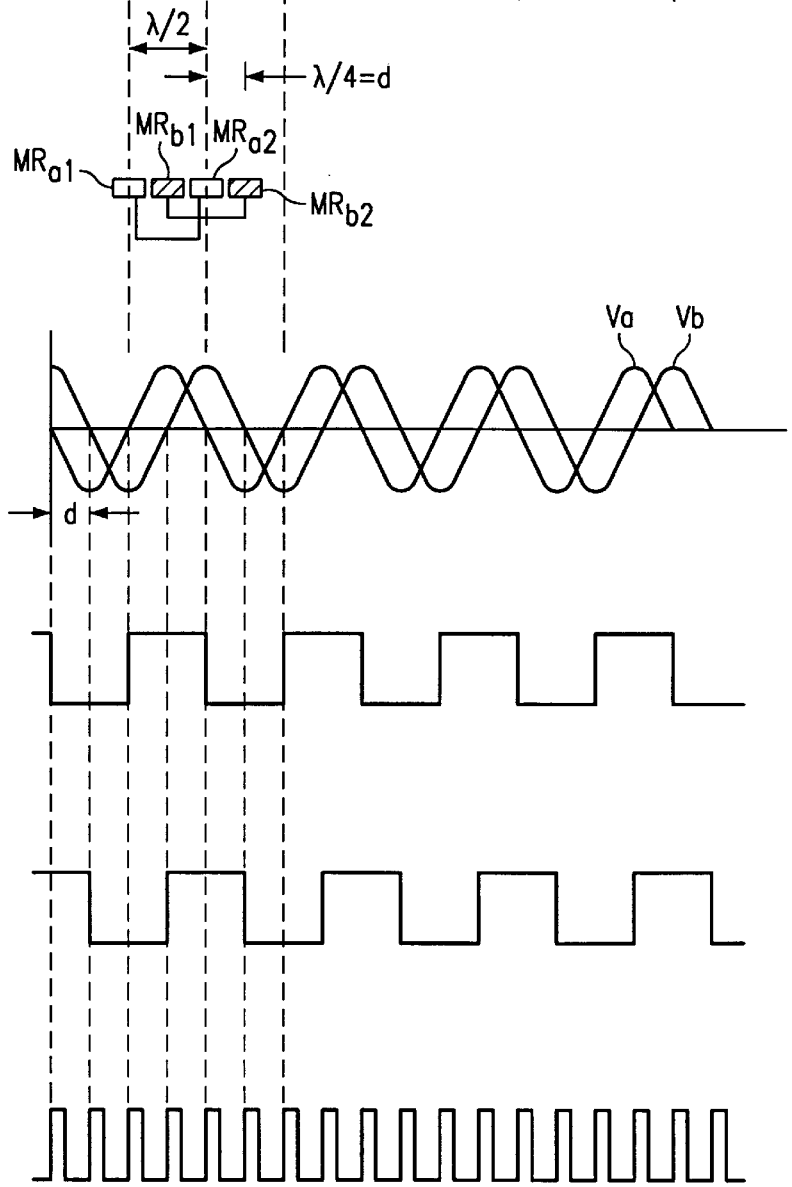
FIG. 9 shows specific arrangement of the magneto-resistive element, the space of magnetic poles of a magnetic rod constituting the MR sensor, and output signals therefrom.

FIG. 9 shows a specific arrangement of the MR element 28 and the intervals of magnetic poles on the magnetized rod 26 constituting the MR sensor, as well as the output signal therefrom. As shown in (a) and (b) of FIG. 9, magnetic poles N and S of magnetized rod 26 are magnetized with a prescribed interval λ. Resolution is determined by the size of the interval λ between magnetic poles N and S.

Figure 10:
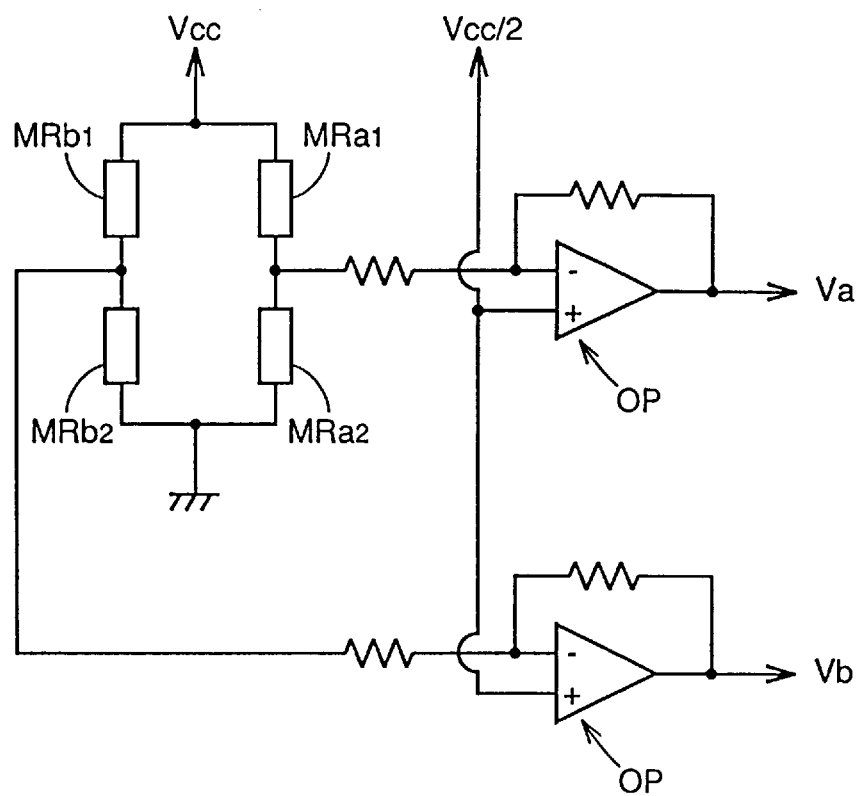
FIG. 10 shows an output signal processing circuit of the MR sensor.

As for the MR element 28, MR elements MRa1 and MRa2 of a group a, forming a pair and arranged with a space of λ/2 therebetween, as well as MR elements MRb1 and MRb2 of a group b, forming a pair and arranged with a space of λ/2 therebetween, are arranged in two sets, apart by a distance d (d=λ/4), as shown in (c) of FIG. 9. Outputs from these MR elements MRa1, MRa2, MRb1 and MRb2 are processed by an output signal processing circuit of which an example is shown in FIG. 10. Then, an output signal Va from MR elements MRa1 and MRa2 of the group a and an output signal Vb of MR elements MRb1 and MRb2 of the group b are output, shifted in phase by d from each other. Therefore, direction of movement can be known from the difference in phase.

When the output signal Va of the MR elements of the group a and the output Vb of the MR elements of the group b are turned to pulses in a pulse signal converting portion and synthesized, a pulse signal having the pitch of λ/4 can be obtained as shown in (g) of FIG. 9. By counting the number of pulse signals, the distance of movement can be detected with the precision of ¼ of the distance λ between the magnetic poles.

Figure 11:
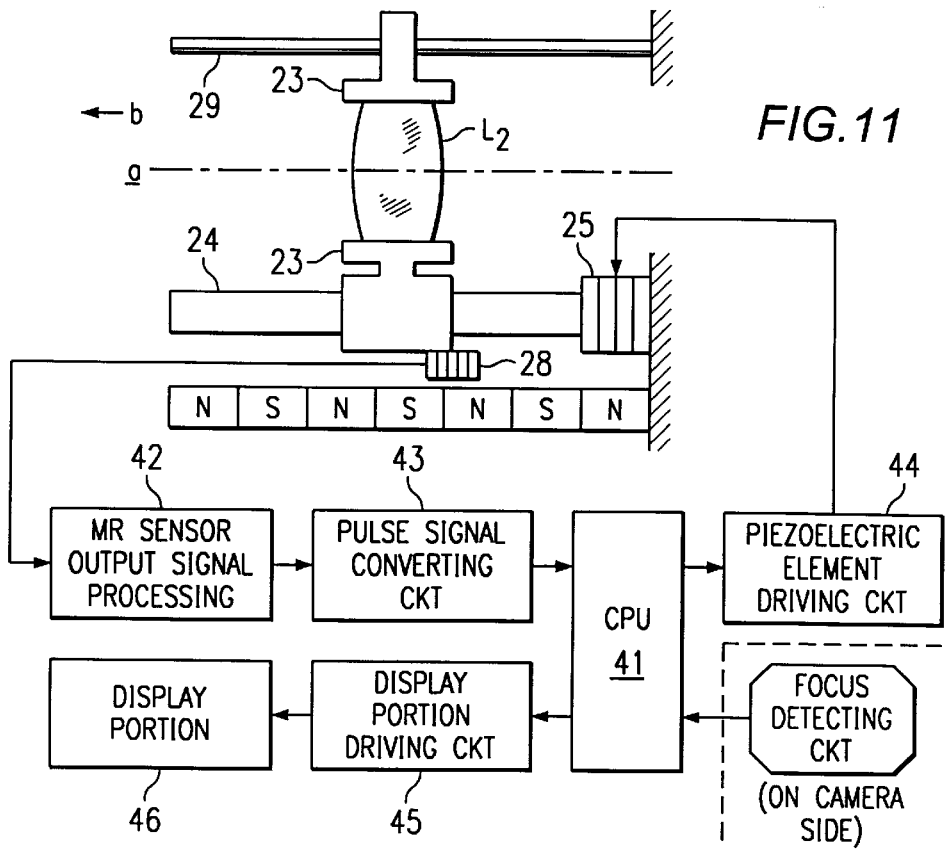
FIG. 11 is a block diagram of a control circuit in the second embodiment.

FIG. 11 is a block diagram of a control circuit for displaying the distance to an object to be photographed, and for adjusting focus of the lens. The control circuit includes a CPU 41, an MR sensor output signal processing circuit 42 connected through a pulse signal converting portion 43 connected to an input port, a piezoelectric element driving circuit 44 connected to an output port, a display portion driving circuit 45 and a display portion 46. The control operation will be described. Focus detection information with respect to the object to be photographed is output from a focus detecting circuit provided on the side of the (not shown) and is input to CPU 41. CPU 41 receives focus detection information and, if it is determined that movement of lens L2 in the direction of the arrow b (see FIG. 6) is necessary from the information, output of a driving pulse having such a waveform that includes a moderate rising portion followed by an abrupt falling portion (as shown in FIG. 4) is requested from piezoelectric element driving circuit 44. Piezoelectric element driving circuit 44 drives piezoelectric element 25 in accordance with the requested waveform. Movement of the lens holding frame 23 caused by the displacement of piezoelectric element 25 is the same as in the first embodiment, and therefore description thereof is not repeated.

When the focus detecting circuit on the side of the camera (not shown) detects an in-focus state, a signal is input to the CPU 41. CPU 41 then gives an instruction to piezoelectric element driving circuit 44 so as to stop output of driving pulses to piezoelectric element 25, whereby lens holding frame 23 stops its movement.

While lens holding frame 23 moves, MR element 28 of the MR sensor attached to lens holding frame 23 detects magnetic poles magnetized on magnetized rod 26 at prescribed intervals. The detected signal is processed by MR sensor output signal processing circuit 42, and converted to pulse signals by pulse signal converting portion 43, and then input to CPU 41. By counting the number of pulse signals, CPU 41 obtains positional information of lens holding frame 23 in the in-focus state, calculates and converts the positional information to information of distance to the object to be photographed, and the information of the distance to the object is displayed on display portion 46 through display portion driving circuit 45. As for the display portion 46, any known display device such as a liquid crystal display may be utilized.

Figure 12:
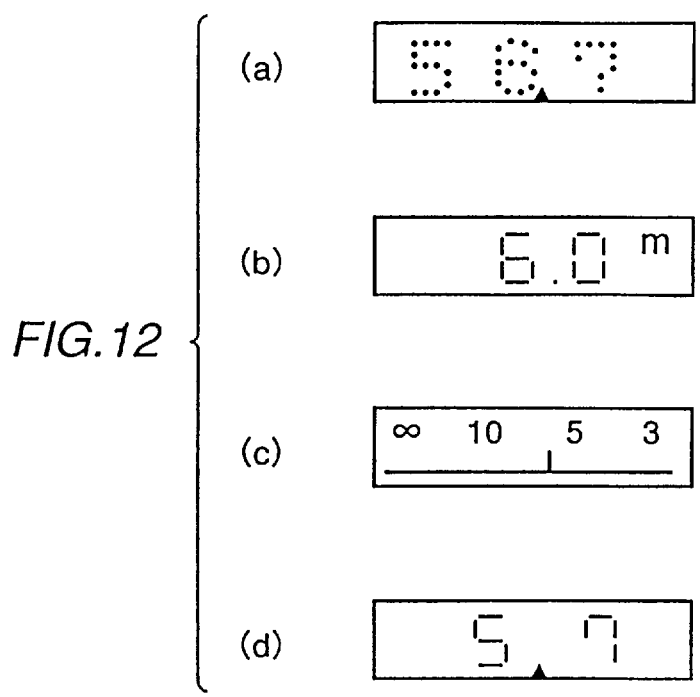
FIG. 12 shows multiple examples of an object distance displaying portion in the second embodiment.

As for the position of the display portion 46, it may be arranged freely, for example, on the lens barrel, or it may be incorporated in various data display portions on a camera body. The method of display may be (a) digital display using dots, (b) digital display using digits of 7 segments, (c) analog display in which an index is displayed by means of dots on a scale, (d) numerals ahead of and behind the distance to the object obtained from the result of operation displayed on the left and the right of the index, as shown in FIG. 12.

Driving axis 24 and magnetized rod 26 are provided separately in the second embodiment described Above. In this case, when driving axis 24 and magnetized rod 26 are set not parallel to each other (for example, the gap between MR element 28 of the MR sensor on lens holding frame 23 driven by the driving axis 24 and the magnetized rod 26 varies or MR element 28 and magnetized rod 26 are inclined), possible errors in detection may occur. In order to cope with this problem, the driving axis 24 may be used also as the magnetized rod 26.

Figure 13:
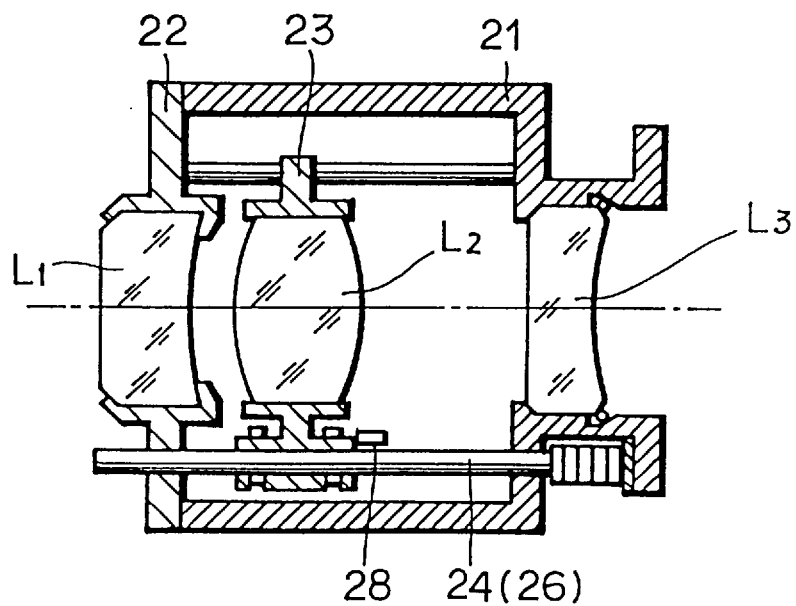
FIG. 13 is a cross section showing modifications of the driving axis and the magnetized rod of the second embodiment.

FIG. 13 shows a modification of the second embodiment in which the driving axis also serves as the magnetized rod, and this figure is a cross section along the optical axis of the lens unit. In this modification, the space between MR element 28 of the MR sensor and the magnetized rod 26 serving also as the driving axis 24 does not change even when lens holding frame 23 moves, and therefore there is not a possibility of erroneous detection.

Though information of distance to the object is displayed in the above described embodiments, the present invention can be directly applied to display information of focal length. For example, in the embodiment shown in FIGS. 1 to 5, the present invention may be applied to a variable magnification lens. In the embodiment shown in FIGS. 6 and the following, a manual zoom operating portion or a focal length determining circuit may be provided in place of the focus detection circuit of FIG. 11.

In the embodiments above, one end of piezoelectric element 15 is fixed on lens outer barrel 11 as shown in FIG. 2. Driving axis 14, adhered to the other end of piezoelectric element 15, is movably supported parallel to the optical axis by means of the flange portion of outer barrel 11a and the flange portion of the first lens holding frame 12b. If the member for fixing the piezoelectric element 15 and the element for supporting the driving axis 14 and further the member on which magnetized rod 26 for position detection is attached are separate members, adjustment during assembly may be troublesome.

Figures 14A, 14B:
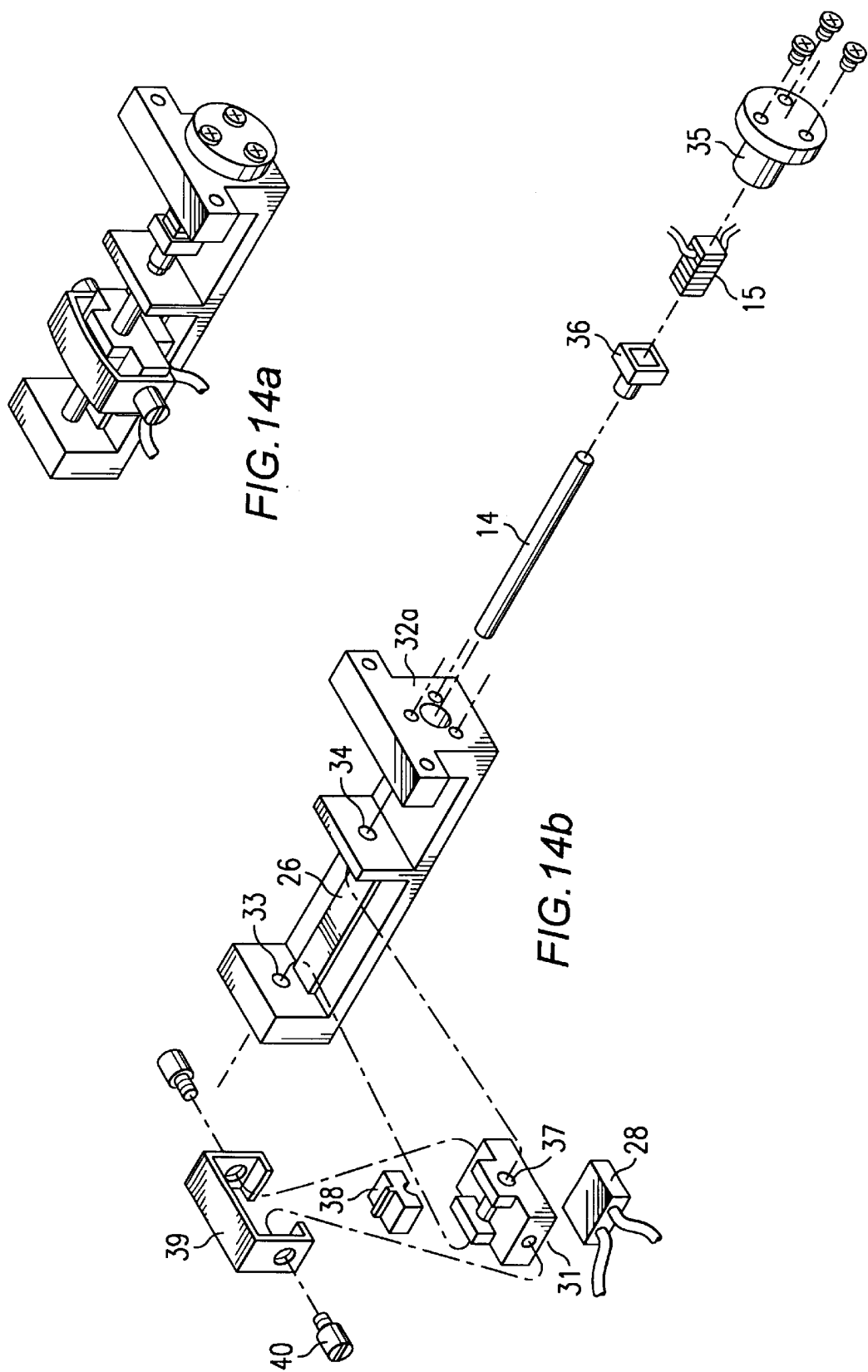

A specific example in which a plurality of members related to driving are integrated into one unit will be described with reference to FIGS. 14a, 14b, 15a and 15b. FIGS. 14a and 14b are perspective views of an assembly of a lens unit and schematic diagram showing the structure thereof in which a piezoelectric element 15 for driving, a driving axis 14, a slider 31 (member coupling to the lens holding frame) driven by the vibration of driving axis 14, an MR element 28 for detecting position of slider 31 and magnetized rod 26 are integrated into one unit.

Driving axis 14, adhered to one end of piezoelectric element 15, is supported by support holes 33 and 34 formed in a seat 32a. Meanwhile, the other end of piezoelectric element 15 is fixed on a base 35, which base 35 is screwed on the seat 32a. A cap 36 is provided for increasing an area of adhesion for an adhering portion between piezoelectric element 15 and driving axis 14 to which compression force and tensile force are applied repeatedly, and for preventing moisture at the adhering portion. Namely, it is for reinforcing the adhering portion. Similarly, by providing the cap 36 at the adhering portion between base 35 and piezoelectric element 15, the adhering portion can be reinforced.

Driving axis 14 passes through a hole 37 formed in slider 31. Contact member 38 has a groove which is in friction coupling with driving axis 14 provided at its lower surface, and the contact member 38 is attached at a position sandwiching the driving axis 14 between contact member 38 and slider 31. Further, a pressurizing plate 39 for applying pressure contact force so as to enable slider 31 and contact portion 38 to grip the driving axis 14, is fixed by means of pins 40 on slider 31. Though not shown, a lens holding frame engaging with pins 40 is provided, and as the slider 31 moves along the driving axis 14, the lens holding frame 23 moves along the optical axis.

On a lower surface of slider 31, an MR element 28 is arranged. Magnetized rod 26 is arranged on seat 32a at a position opposing to the path of movement of MR element 28.

As already described, a plurality of members related to driving are provided as one unit, and the unit is attached to the lens barrel 21 by means of a fitting hole formed in seat 32a.

In FIGS. 15a and 15b, a seat 32b at a position opposing to the moving path of MR element 28 is itself directly magnetized.

Instead of the hole 37 provided in slider 31, only a groove may be formed in the upper surface of slider 31. By the structure in which driving axis is gripped by the groove of slider 31 and the groove formed in the contact member, it becomes possible to attach the slider to the driving axis after the driving axis is mounted on the seat.

(3) Third Embodiment

Figure 16:
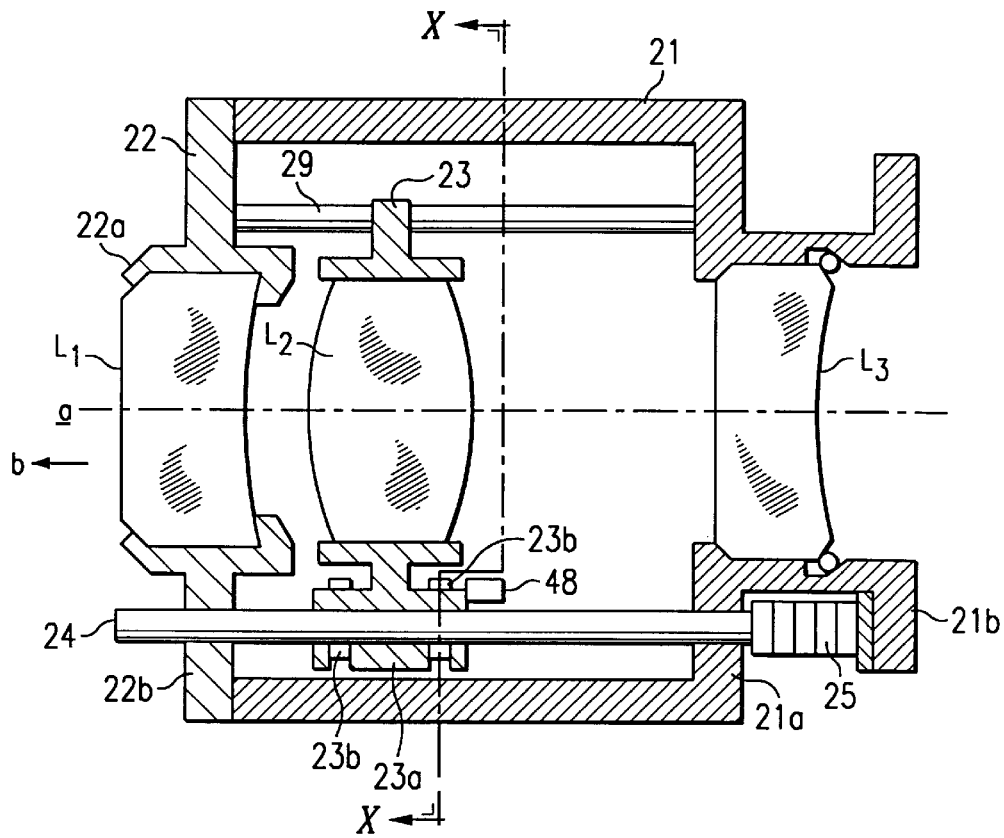
FIG. 16 is a cross section showing a structure of a third embodiment of the present invention.
Figure 17:
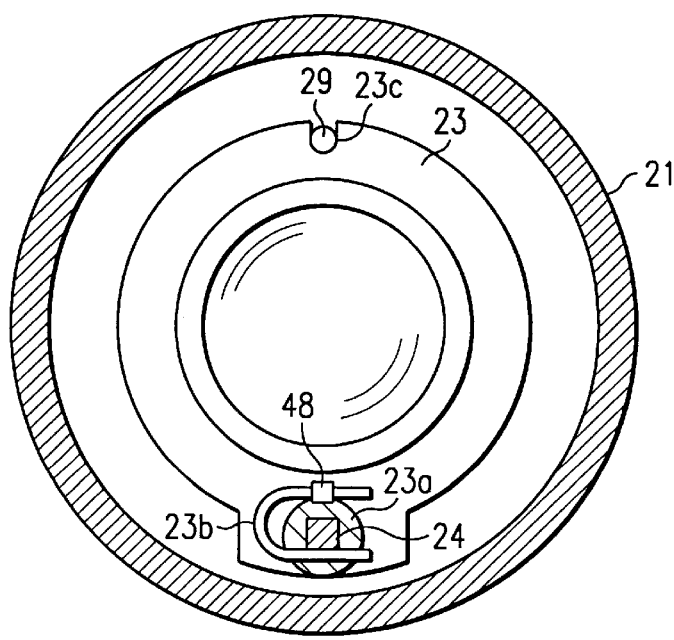
FIG. 17 is a cross section taken along the line X—X of the lens unit shown in FIG. 16.

A third embodiment of the present invention will be described. FIGS. 16 and 17 show optical element position detecting apparatus in the lens unit in accordance with the third embodiment, which corresponds to FIGS. 6 and 7 of the second embodiment. Referring to FIGS. 16 and 17, in the third embodiment, the driving axis of the second embodiment also serves as the magnetic rod. The driving axis 24 is magnetized with N and S magnetic poles at prescribed intervals, and together with MR element 48 of the MR sensor, it detects the distance of movement of lens holding frame 13. In this embodiment, MR element 48 is provided opposing to driving axis 24. Other than that, the structure is the same as the second embodiment, and therefore description thereof is not repeated.

Figure 18:
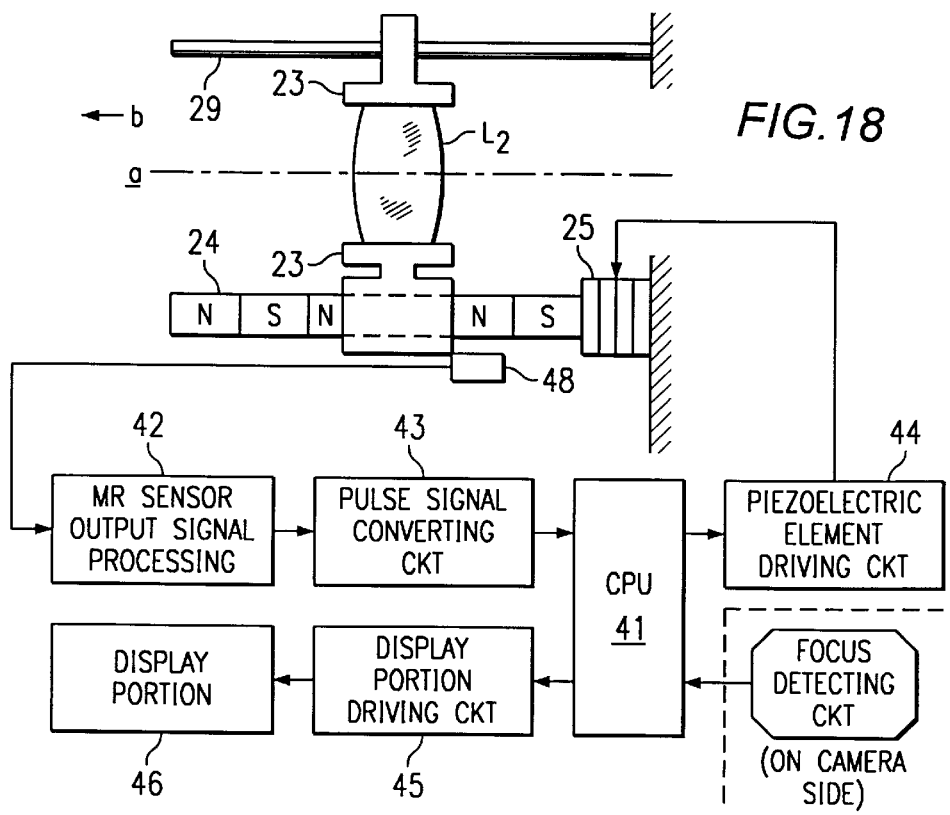
FIG. 18 is a block diagram of a control circuit in accordance with the third embodiment.

FIG. 18 is a block diagram of a control circuit displaying the distance to the to be photographed and for focus adjustment of the lens in the third embodiment, which corresponds to FIG. 11 of the second embodiment. As already described, driving axis 24 itself serves as the magnetized rod. Except for this point, the control circuit is the same as the embodiment above, and therefore description thereof is not repeated.

(4) Fourth Embodiment

A fourth embodiment of the present invention will be described. In the third embodiment, the driving axis 24 also serves as the magnetized rod. In the fourth embodiment, the guiding axis 49 also serves as the magnetized rod.

Figure 19:
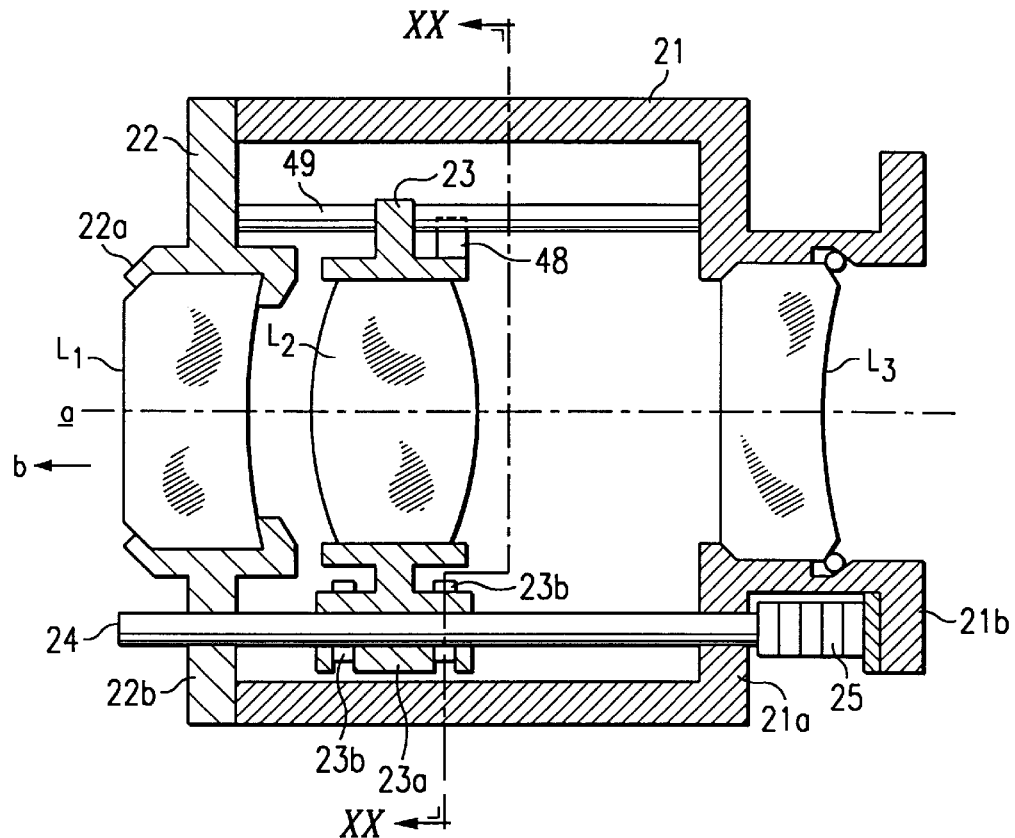
FIG. 19 is a cross section showing a structure of a fourth embodiment of the lens unit to which the optical element position detecting apparatus of the present invention is applied.
Figure 20:
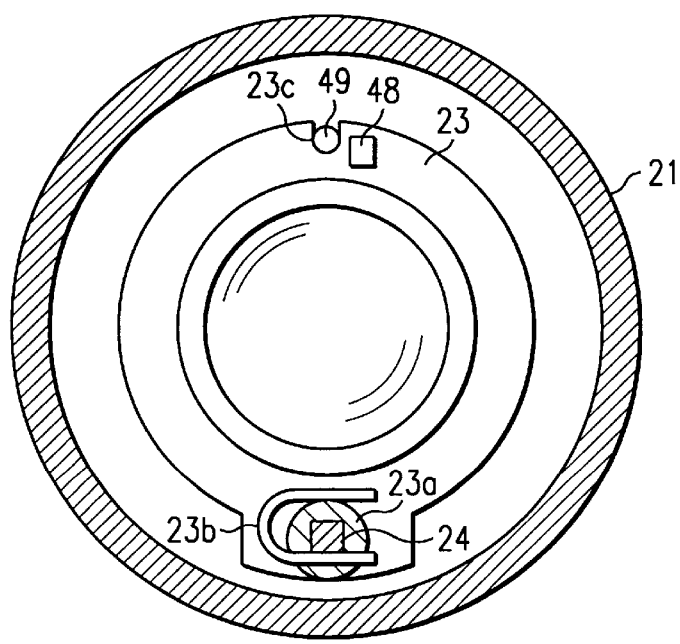
FIG. 20 is a cross section taken along the line XX—XX of the lens unit shown in FIG. 19.

FIG. 19 is a cross section of the lens unit structure in accordance with the fourth embodiment, and FIG. 20 is a cross section taken along the line XX—XX of FIG. 19. Since the structure is similar to the third embodiment, portions corresponding to the third embodiment are denoted by the same reference characters and detailed description is not repeated. N and S magnetic poles are magnetized at prescribed intervals on guiding axis 49 and it also serves as the magnetized rod for detecting the distance of movement of lens holding frame 23, in cooperation with the MR element 48 of MR sensor.

Even when the guiding axis 49 is also used as the magnetized rod, the gap between the MR element 48 on the lens holding frame 23 and the magnetized rod 49 which is the guiding axis does not vary.

(5) Fifth Embodiment

A fifth embodiment of the present invention will be described, in which the lens position detecting apparatus employs an MR element of which resistance changes in accordance with the change in the magnetic field.

Figure 21:
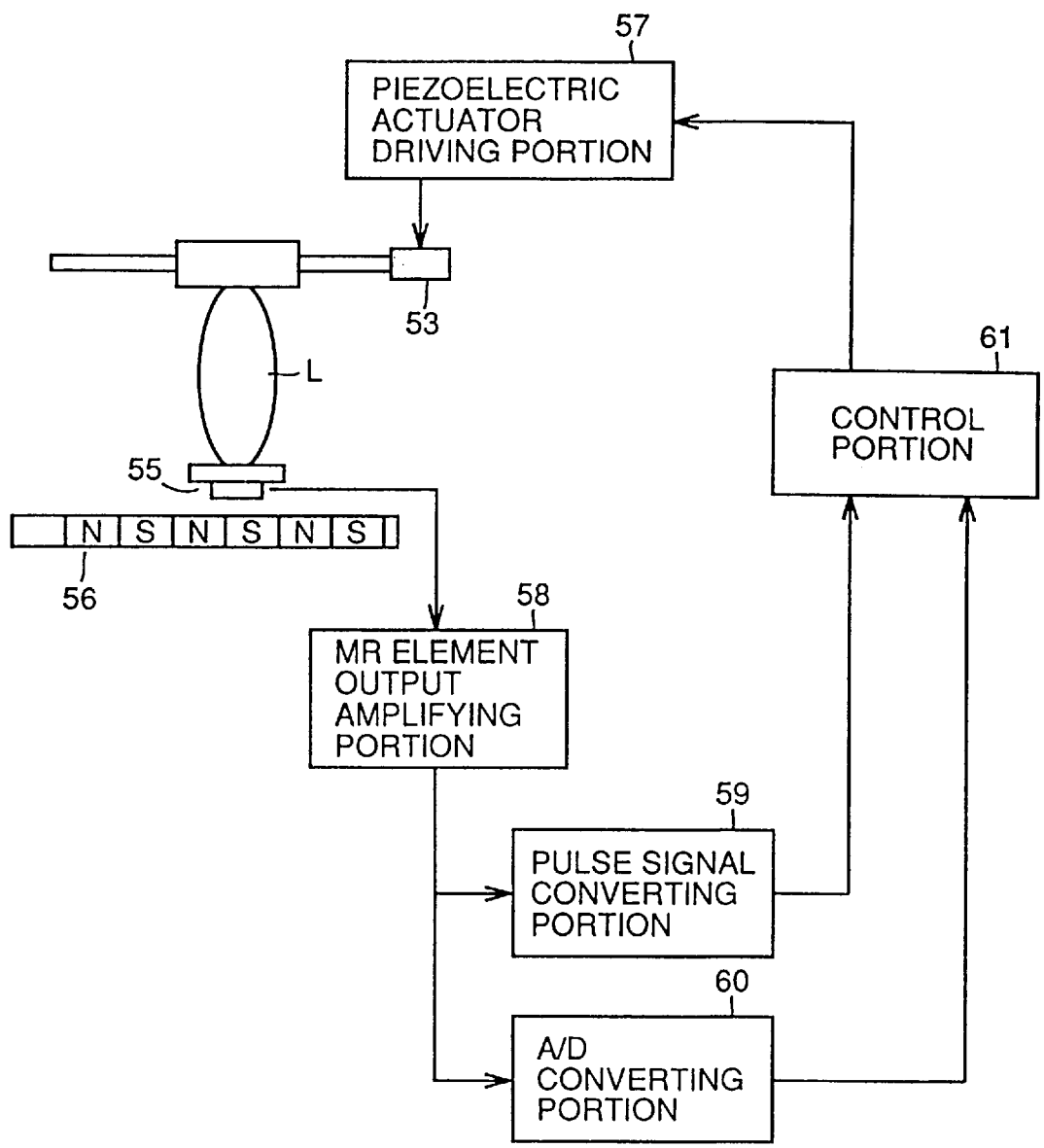
FIG. 21 is a block diagram showing a fifth embodiment of the present invention.

FIG. 21 is a block diagram showing a structure of a lens position detecting apparatus in accordance with this embodiment. Referring to FIG. 21, the lens position detecting apparatus includes an MR element 55 on which a lens L is mounted, a magnetized rod 56 integral with the MR element 55 for position detection, an MR element output amplifying portion 58 for processing an output signal from MR element 55, a pulse signal converting portion 59, an A/D converting portion 60 and a control portion 61. Driving of the lens L along an optical axis is performed by controlling a piezoelectric actuator 53 by a piezoelectric actuator driving portion 57. Detection of the position of the lens L is performed by a combination of MR element 55 and magnetized rod 56. An output signal from MR element 55 is amplified by MR element output amplifying portion 58. The amplified signal is compared with an intermediate level of the aforementioned signal at the pulse signal converting portion 59, and converted into a pulse signal. The output signal from MR element 55 is also input to A/D converting portion 60, where it is converted to a digital value, and in control portion 61, interpolation calculation is performed.

Figure 22:
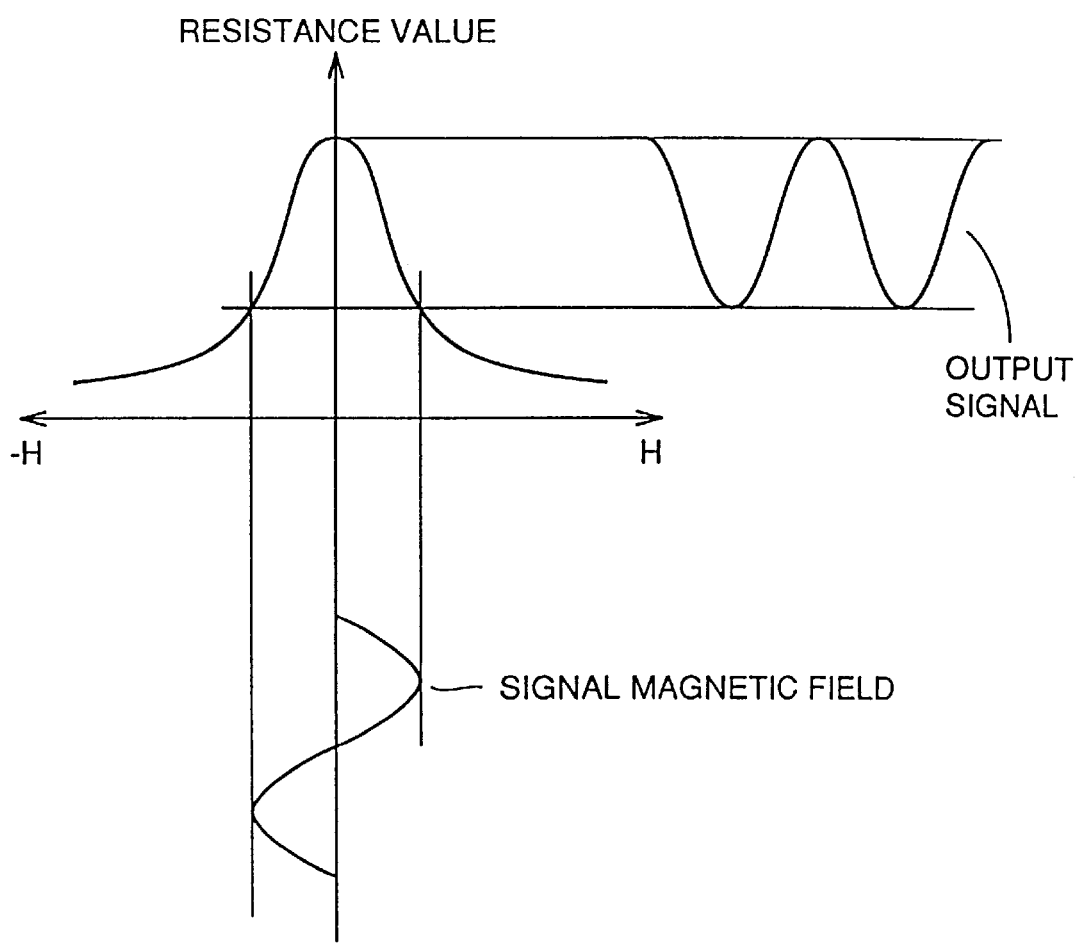
FIG. 22 shows a characteristic of change in resistance with respect to the magnetic field of the MR element in accordance with the fifth embodiment.

FIG. 22 shows characteristic of change in resistance with respect to the magnetic field of MR element. In this figure, the X axis represents strength of the magnetic field, and the Y axis represents resistance value. This figure also shows the relation between the output signal and the signal magnetic field of the MR element 55.

Figure 23:
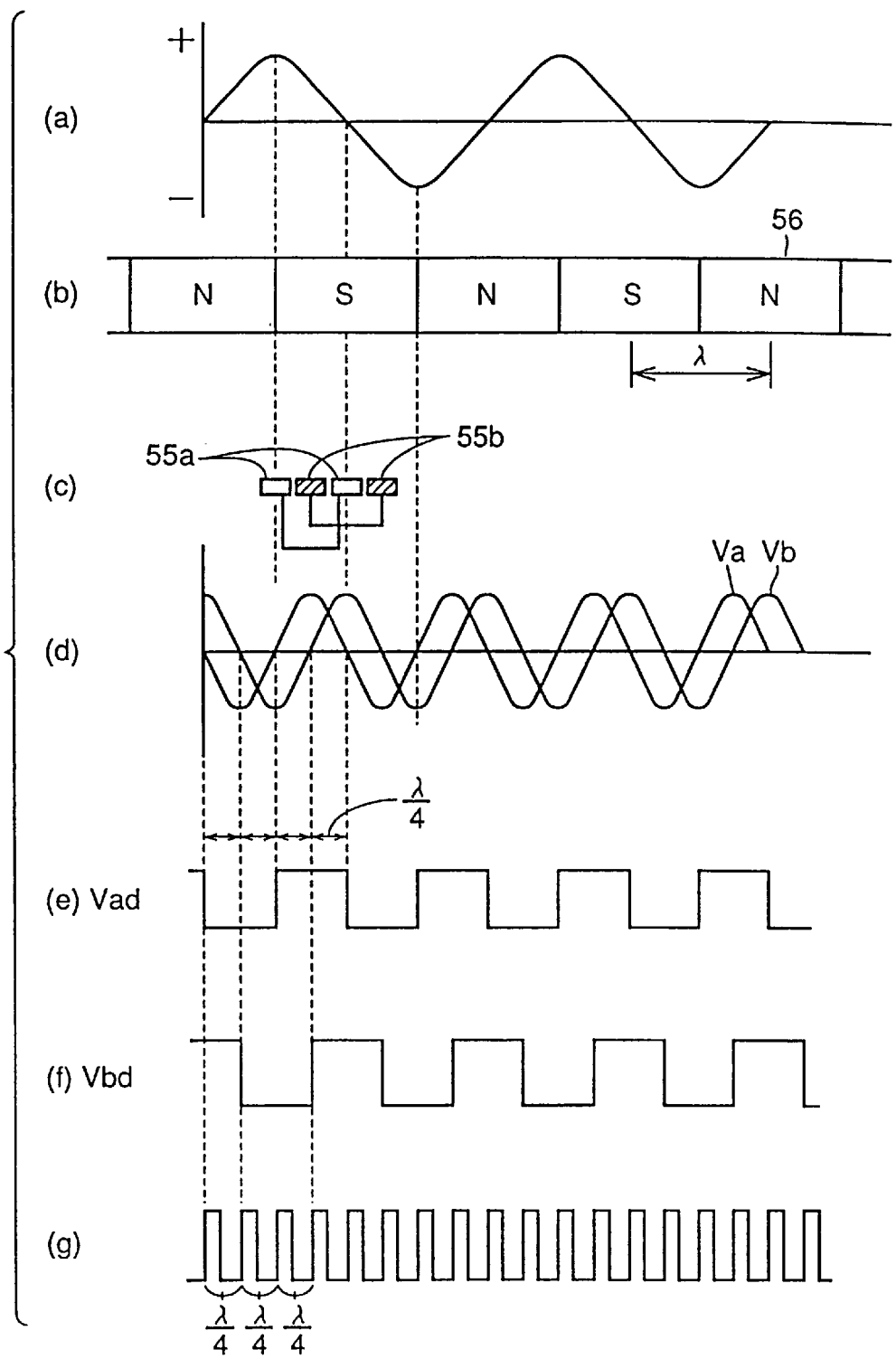
FIG. 23 shows an output signal waveform of the MR element with respect to a magnet, and a signal obtained at a pulse signal converting portion, in the fifth embodiment.

FIG. 23 shows relation between the output signal and the magnets of MR element 55 used in this embodiment, which corresponds to FIG. 9 of the first embodiment. Since the magnetized rod 56 is magnetized as shown in (b), the magnetic field changes as shown by (a). Two sets of paired MR elements 55a to 55b are arranged thereon, as shown in (c). As a result, sinusoidal wave represented by Va is output from one pair of MR elements 55a as shown by (d), and a sinusoidal wave signal represented by Vb having its phase shifted by 90° from Va is obtained from the other pair of MR elements 55b. Based on these signals, a signal Vad which is the pulse signal corresponding to Va shown in (e) and a signal Vbd, which is a pulse signal of Vb shown in (f) are obtained. Based on the rise and fall of these signals, an output signal having the pitch of λ/4 is obtained from the pulse signal converting portion 59, as shown in (g).

Figure 24:
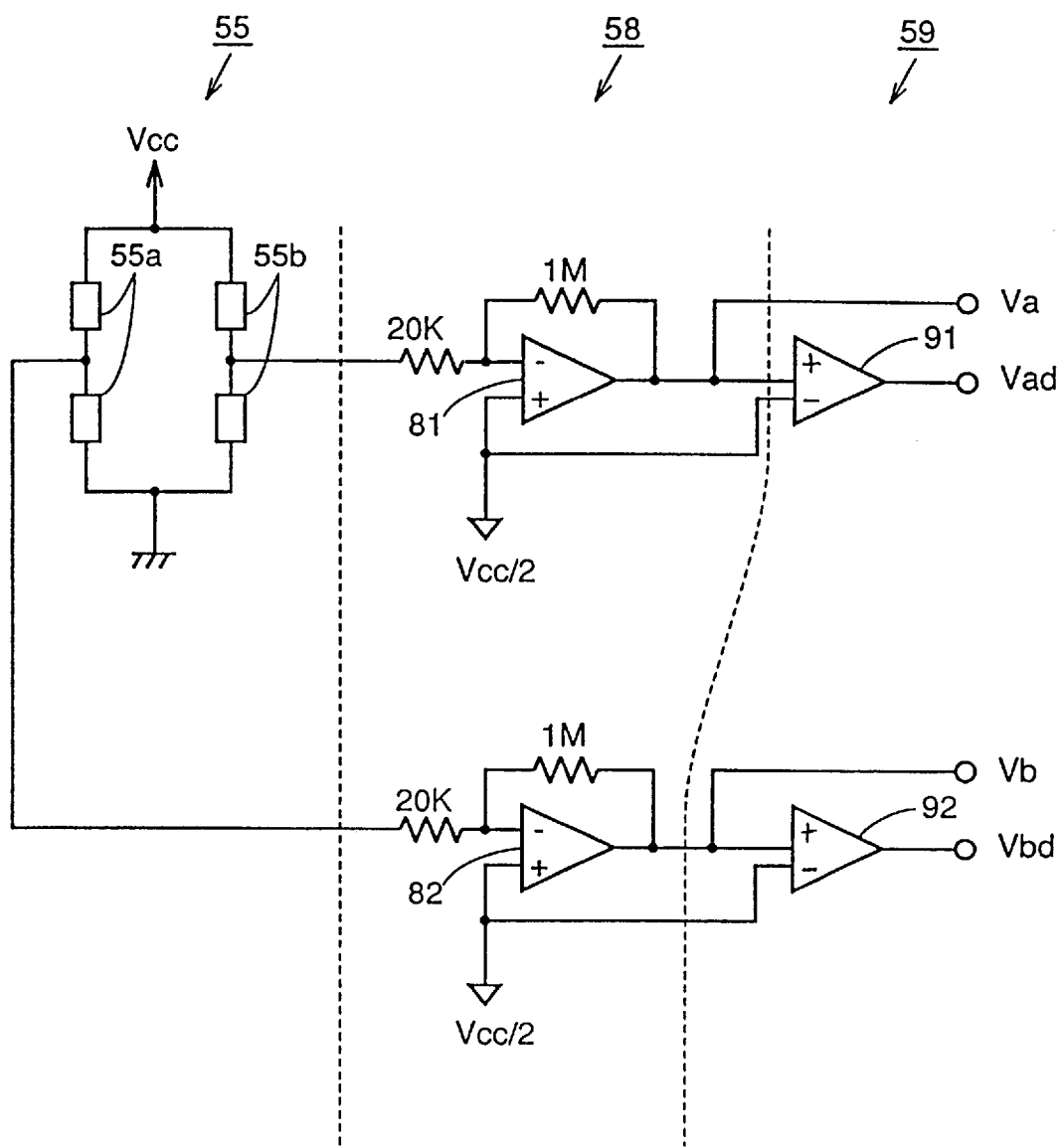
FIG. 24 is a schematic diagram showing an MR element, an MR element output amplifying portion, and a pulse signal converting portion.

FIG. 24 shows circuits for MR element 55, MR element output amplifying portion 58 and pulse signal converting portion 59 shown in FIG. 21. Referring to FIG. 24, the output from MR element 55 is amplified by operational amplifiers 81 and 82 of MR element output amplifying portion 58, and by comparators 91 and 92 of pulse signal converting portion 59, pulse signals Vad and Vbd are obtained. Here, operational amplifiers 81 and 82 amplify, by about 50 times, the output signal from the MR element 55.

Figure 25:
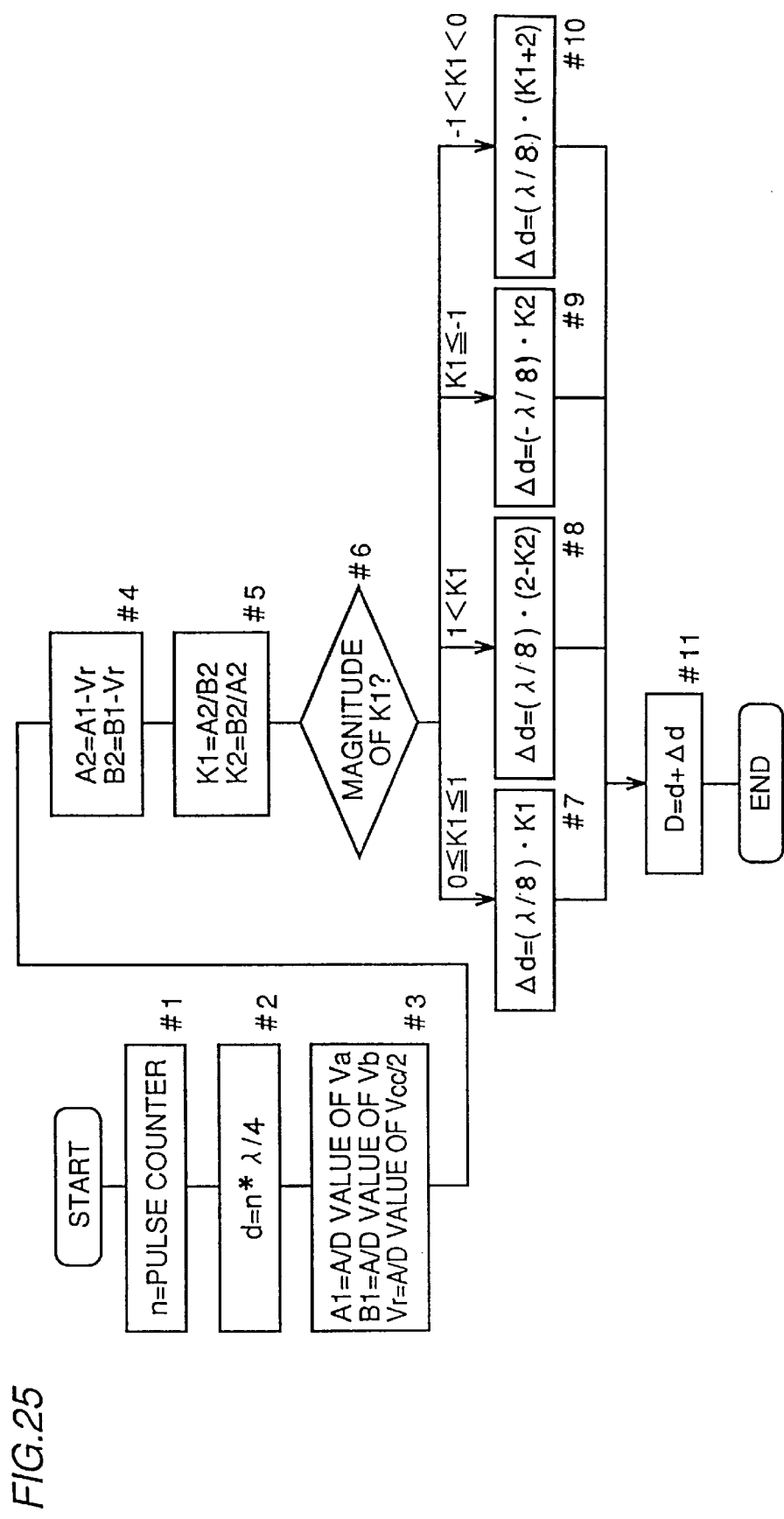
FIG. 25 is a flow chart showing a method of detecting lens position.

FIG. 25 is a flow chart showing the method of detecting lens position. Referring to FIG. 25, the method of detecting the lens position will be described. A signal output from pulse signal converting portion 59 is input to a pulse counter provided in the control portion 61. The count value of the input pulse signals is read, and the value is represented by n (in step #1, hereinafter "step" will be omitted). The amount of movement of the lens per 1 pulse of the signal is $\lambda/4$ as shown in FIG. 23. Therefore, approximate distance d of movement can be calculated by $n*\lambda/4$ where $\lambda$ represents distance between an N pole to an adjacent S pole of the magnet (see FIG. 23 (b)).

The method of calculating distance of movement from one pulse to another will be described. The values of A/D converted analog signals Va and Vb from MR element output amplifying portion 58 are represented by A1 and B1, and a value corresponding to A/D converted value of the intermediate level between analog signals Va and Vb is represented by Vr (#3).

At control portion 61, the A/D converted values of analog signals are converted to values A2 and B2 in accordance with equations A2=A1-Vr, and B2=B1-Vr, so that these values represent difference from the intermediate level (#4), and the ratio between respective signals are calculated in accordance with the equations K1=A2/B2 and K2=B2/A2 (#5).

Figure 26:
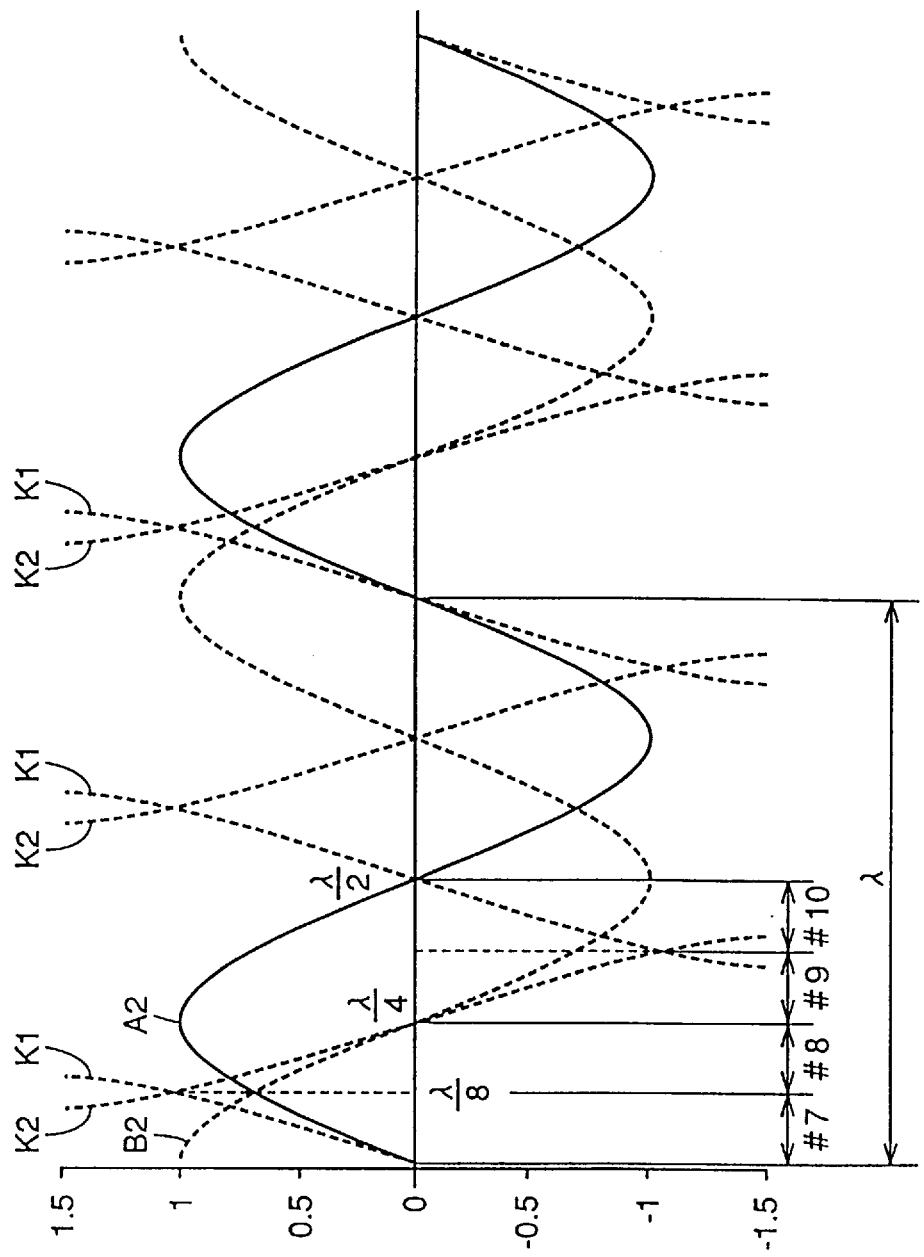
FIG. 26 shows relation between ratio of various signals and two signal waveforms obtained from the MR element.

FIG. 26 shows how the values K1 and K2 calculated in steps #4 and #5 above change. As can be seen from FIG. 26, K1 is a function of monotonous increase having the period of $\lambda/2$, while K2 shows monotonous decrease of the same period. By connecting K1 and K2 at their intersection, a triangular wave having large amplitude can be obtained. By using this triangular wave, control portion 61 performs interpolation.

In the interpolation operation, small distance $\Delta d$ between pulses is calculated in accordance with the equations shown in #7 to #10, in accordance with four cases classified dependent on the value of K1. More specifically, the value $\Delta d$ is calculated in accordance with the equation (1) when K1 is not smaller than 0 and not larger than 1 ($0 \leq x \leq \lambda/8$); in accordance with equation (2) when $1<K1$ ($\lambda/8 < x < \lambda/4$); in accordance with equation (3) when $K1 \leq -1$ ($\lambda/4 \leq x < 3\lambda/8$); and in accordance with equation (4) when $-1<K1<0$ $\lambda/2$) $<x<3\lambda/4$). Portions corresponding to #7 to #10 are explicitly depicted in FIG. 26.

$$\Delta d=(\lambda/8)*K1 \quad (1)$$

$$\Delta d=\lambda/8*(2-K2) \quad (2)$$

$$\Delta d=-(\lambda/8)*K2 \quad (3)$$

$$\Delta d=(\lambda/8)*(K1+2) \quad (4)$$

The final distance of movement D is calculated based on the approximate distance of movement d and the small distance of movement $\Delta d$ (#11).

Figure 27:
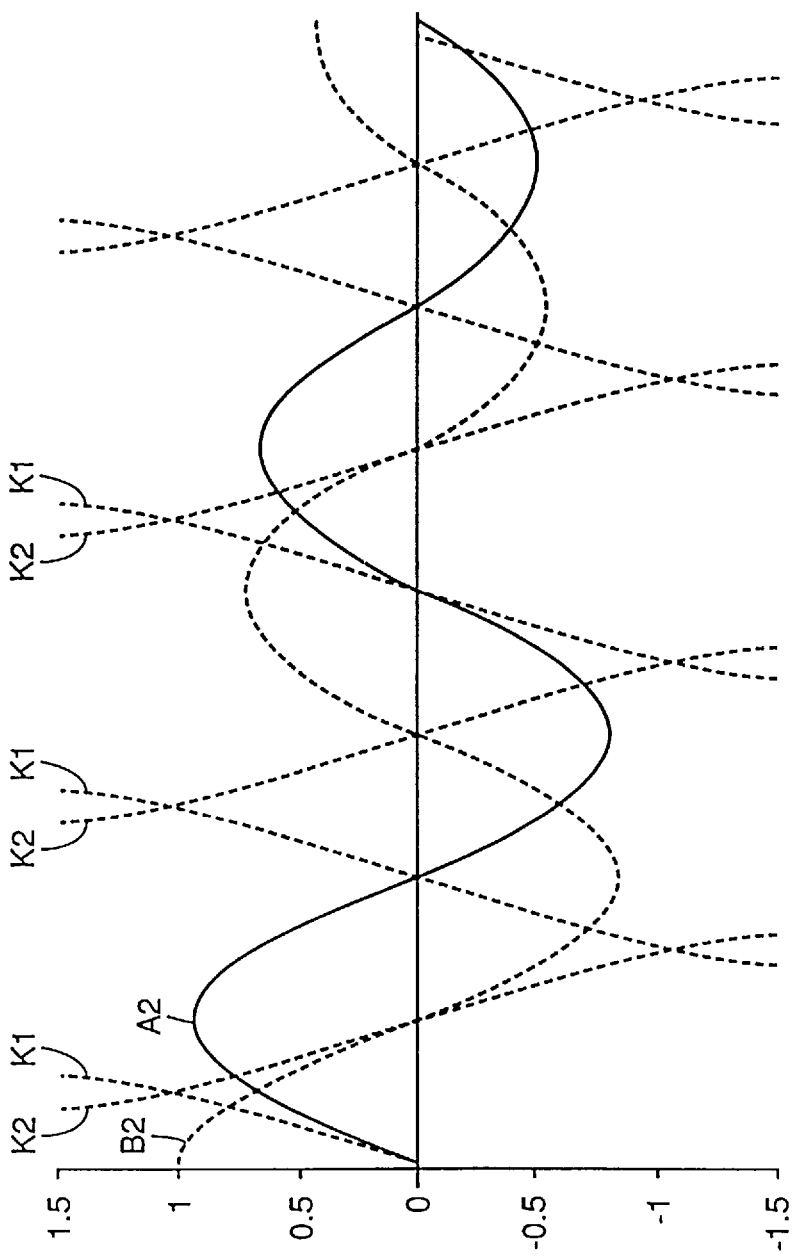
FIG. 27 shows relation of ratios of various signals to each other when signal amplitude varies.

FIG. 27 is a graph corresponding to FIG. 26 showing the result of calculation of the ratios between respective signals when the signal amplitude varies. As can be seen from the figure, even when the amplitude varies, there is not an influence observed on the triangular wave synthesized from the result of calculation of the ratio. More specifically, even when the amplitude of sinusoidal waveforms vary, the variations are canceled, so that stable triangular wave can be obtained constantly, and resolution for detection can be improved stably.

Figure 28A:
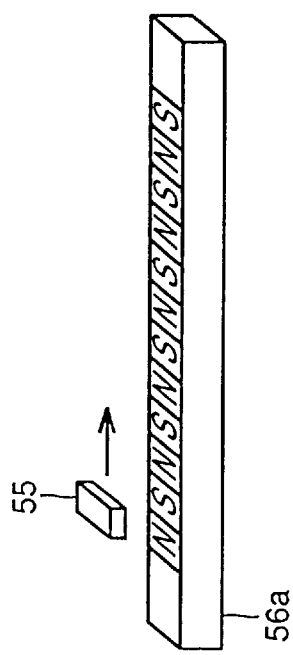
FIGS. 28a to 28c show a signal waveform of an MR element and an example of a magnet structure for detecting end portion of the lens.
Figure 28B:
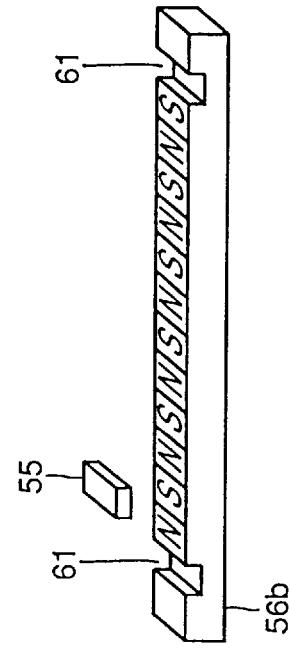
Figure 28C:
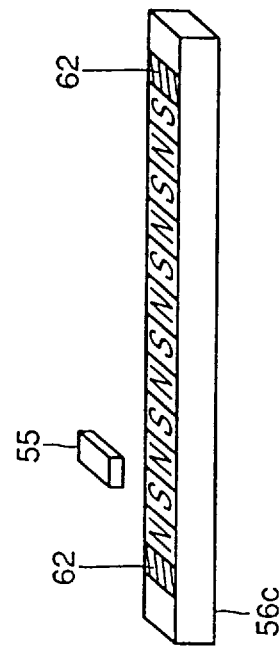

FIG. 28 shows a structure of a magnetized rod 56 for detecting end position in the direction of movement of lens L shown in FIG. 21 and the signal waveform of the MR element 55 obtained at that time. FIG. 28(*a*) shows an example in which a common magnetized rod 56*a* is used. FIG. 28*b* corresponds to an example in which notched grooves 61 are provided on opposing ends of the magnetized rod 56*b*. FIG. 28*c* corresponds to an example in which magnetized rod 56*c* having a thin iron plate attached on the notched groove 21.

As can be seen from the signal waveform shown in FIGS. 28*b* and 28*c*, when application of the magnetic field to the MR element 55 is stopped by the notched groove 61 or the thin iron plate 62 provided thereon, the signal is kept constant at the intermediate level 64. Therefore, by detecting the level 64, the end position of the lens L can be detected. Further, when this structure is used, end position can be visually confirmed, and therefore adjustment of the position of magnetized rod 56 can be done mechanically.

Figure 29:
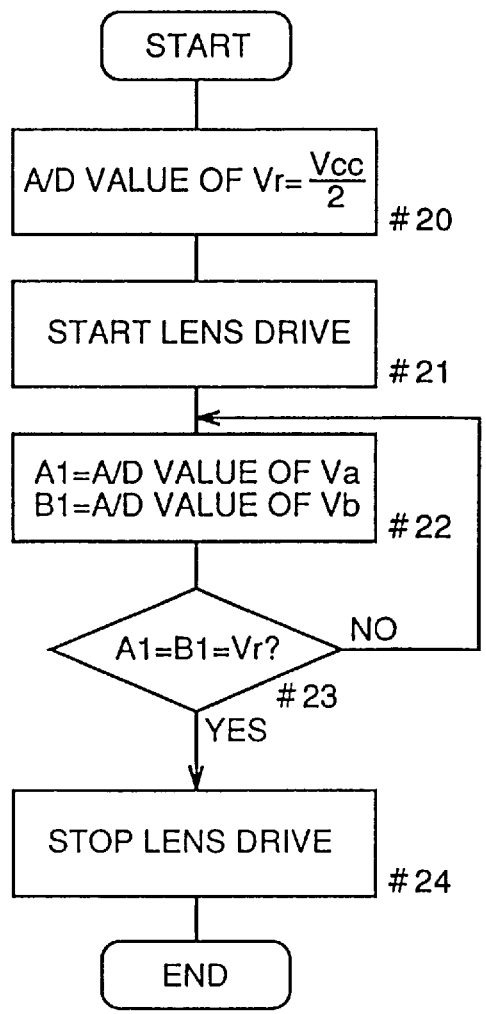
FIG. 29 is a flow chart showing a method of detecting terminal end, of the lens position.
Figure 30:
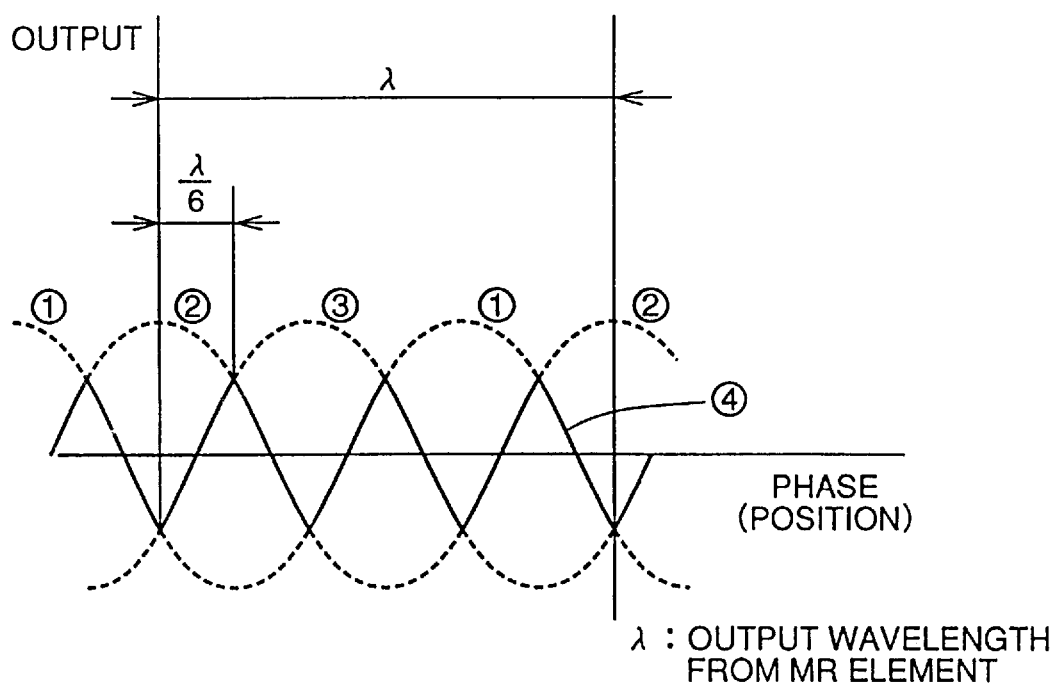
FIG. 30 shows a method of detection of a conventional position sensor.

FIG. 29 is a flow chart showing the method of detecting end position of the lens L using the structure of FIG. 28. Referring to FIG. 29, a value corresponding to A/D converted value of the intermediate level between analog signals Va and Vb is represented by Vr (#20). Piezoelectric actuator driving portion 57 is controlled so that lens L is moved in a prescribed direction (#21). Analog signals Va and Vb from MR element output amplifying portion 56 are subjected to A/D conversion, which converted values are represented by A1 and B1 (#22). Thereafter, whether or not the values A1 and B1 are both equal to Vr is determined (#23). If not, the flow returns to #22, and if the values are equal, it is determined that the lens L is at the end position, so that driving of the lens is stopped (#24).

Though a notched groove 61 is provided at the end position in the above embodiment, it may be provided at any desired position to be detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lens moving apparatus for sliding a lens in a direction of an optical axis in association with driving of a piezoelectric element, the apparatus comprising:

indicating means indicating a position of said lens as position information; and displaying means arranged close to said indicating means, having a scale corresponding to position information of said lens, for visually displaying position information of said lens.

2. The apparatus according to claim 1, further comprising:

an outer barrel; and a lens holding frame which is movable in the direction of the optical axis;

wherein said indicating means has an index provided on said lens holding frame and said display means having said scale is provided on said outer barrel.

3. The apparatus according to claim 1, further comprising:

an outer barrel; and a lens holding frame which is movable in the direction of the optical axis;

wherein said indicating means has an index provided on said outer barrel and said display means having said scale is provided on said lens holding frame.

4. A lens moving apparatus for sliding a lens in a direction of an optical axis in association with driving of a piezoelectric element, the apparatus comprising:

a detector for detecting a position of the lens;

calculating means for calculating a display value based on position information of the lens detected by said detector; and display means for visually displaying the display value calculated by said calculating means.

5. A position detecting apparatus of a moving member, the apparatus comprising:

a detector for detecting first and second sinusoidal wave signals output as said moving member moves, said first and second sinusoidal wave signals being different in phase by 90°;

control means for calculating a ratio of said first and second sinusoidal wave signals to each other and for forming a new waveform signal based on the calculated ratio; and measuring means for measuring a position of the moving member based on said new waveform signal.

6. The position detecting apparatus according to claim 5, wherein the waveform signal based on the ratio of said first and second sinusoidal wave signals has a triangular shape.

* * * * *